(12) United States Patent
Liu et al.

(10) Patent No.: US 11,245,885 B2
(45) Date of Patent: Feb. 8, 2022

(54) METHOD AND SYSTEM FOR PLAYING MEDIA DATA

(71) Applicant: BANMA ZHIXING NETWORK (HONGKONG) CO., LIMITED, Kowloon (HK)

(72) Inventors: Yongqin Liu, Beijing (CN); Jiangwei Li, Beijing (CN); Hongbo Min, Shanghai (CN); Xueshu Zhong, Shanghai (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 145 days.

(21) Appl. No.: 16/144,525

(22) Filed: Sep. 27, 2018

(65) Prior Publication Data

US 2019/0116348 A1     Apr. 18, 2019

Related U.S. Application Data

(63) Continuation-in-part of application No. PCT/CN2017/076893, filed on Mar. 16, 2017.

(51) Int. Cl.
*H04N 9/79* (2006.01)
*H04N 21/443* (2011.01)
*G06F 9/54* (2006.01)
*G11B 20/00* (2006.01)
*G11B 27/36* (2006.01)

(52) U.S. Cl.
CPC .......... *H04N 9/7921* (2013.01); *G06F 9/541* (2013.01); *G11B 20/00007* (2013.01); *G11B 27/36* (2013.01); *H04N 21/443* (2013.01); *G11B 2020/00072* (2013.01)

(58) Field of Classification Search
CPC .......... G06F 16/188; G06F 8/63; G06F 8/658; G06F 9/4406; G06F 9/441; G06F 9/44505; G06F 9/4451; G06F 9/45533; G06F 9/543
See application file for complete search history.

(56) References Cited

U.S. PATENT DOCUMENTS 6,182,158 B1 * 1/2001 Kougiouris ......... G06F 9/45537
                                                               719/328
7,546,449 B2    6/2009 Wu
                        (Continued)

FOREIGN PATENT DOCUMENTS

CN    102981887         3/2013
CN    102981887 A  *    3/2013    ............. G06F 9/455
                        (Continued)

*Primary Examiner* — Gelek W Topgyal
(74) *Attorney, Agent, or Firm* — Van Pelt, Yi & James LLP

(57) ABSTRACT

A method for playing media data is disclosed, including: transmitting, by a first operating system, a request for processing the media data to a second operating system, the first operating system and the second operating system being installed on a same device; receiving, by the first operating system, processing results from the second operating system, wherein the second operating system is configured to process the media data based at least in part on the request to generate the processing results; and playing the media data by the first operating system based at least in part on the processing results.

20 Claims, 9 Drawing Sheets

(56) References Cited

U.S. PATENT DOCUMENTS

| | | | |
|---|---|---|---|
| 7,774,762 B2* | 8/2010 | Rochette | G06F 8/61 |
| | | | 717/138 |
| 2008/0086728 A1 | 4/2008 | Lam | |
| 2008/0256564 A1* | 10/2008 | Fathalla | G06F 9/45537 |
| | | | 719/331 |
| 2012/0066333 A1* | 3/2012 | Browning | G06F 9/541 |
| | | | 709/212 |
| 2014/0108951 A1 | 4/2014 | Dharawat | |
| 2014/0146895 A1* | 5/2014 | Xu | H04N 19/42 |
| | | | 375/240.25 |
| 2015/0094150 A1* | 4/2015 | Gregory | A63F 13/30 |
| | | | 463/42 |
| 2015/0324209 A1 | 11/2015 | Hsu | |
| 2016/0062940 A1* | 3/2016 | Cota-Robles | G06F 9/45558 |
| | | | 710/313 |
| 2016/0378461 A1* | 12/2016 | Huang | G06F 16/23 |
| | | | 717/169 |

FOREIGN PATENT DOCUMENTS

| | | | | |
|---|---|---|---|---|
| CN | 102981894 | | 3/2013 | |
| CN | 102981894 A | * | 3/2013 | ............... G06F 9/46 |
| CN | 103488466 | | 1/2014 | |

\* cited by examiner

METHOD AND SYSTEM FOR PLAYING MEDIA DATA

CROSS REFERENCE TO OTHER APPLICATIONS

This application is a continuation-in-part of and claims priority to International (PCT) Application No. PCT/CN2017/076893 entitled MEDIA DATA PLAYING METHOD, DEVICE, AND INTELLIGENT TERMINAL filed Mar. 16, 2017 which is incorporated herein by reference for all purposes, which claims priority to People's Republic of China Patent Application No. 201610184627.6 entitled A MEDIA DATA PLAYBACK METHOD AND DEVICE, AND A SMART TERMINAL filed Mar. 28, 2016 which is incorporated herein by reference for all purposes.

FIELD OF THE INVENTION

The present application relates generally to the field of computer technology and more particularly to a method and system for playing media data.

BACKGROUND OF THE INVENTION

In the Internet era, open source based operating systems for terminal devices are becoming mainstream platforms of smart terminal devices on the strength of its open and advanced technologies.

With the open structure of an operating system on devices, multiple operating systems can be configured for a single computing device. For example, a host operating system (host OS) and a guest operating system (guest OS) can be both configured at one computing device. Generally, the host OS is a native operating system executed by default upon the starting up of the computing device, while the guest OS runs only when supported by other operating systems, e.g., the host OS. Upon starting a computing device, the host OS executes first on a computing device, and then invokes the guest OS into execution, for which the host OS is configured to supply computing resources such as access to lower layer interfaces (e.g., device driver interfaces, memory access controller interfaces, etc.)

On the other hand, with the increasing development of both the software and hardware technologies, the multimedia functionalities available at terminal devices are becoming more diversified and powerful. As a result, an increasingly large number of media formats need to be supported at terminal devices. However, due to the inability of an operating system to support all types of media formats, e.g., the host OS is not configured to process the media data from all the third party applications, the terminal device on which the host OS executes is not always able to play the media data provided by one or more third party applications.

Thus, as the host OS of a terminal device typically does not support every media data format, there exists the problem of inability to play certain types of media data on a terminal device.

BRIEF DESCRIPTION OF THE DRAWINGS

Various embodiments of the invention are disclosed in the following detailed description and the accompanying drawings.

DETAILED DESCRIPTION

Figure 1:
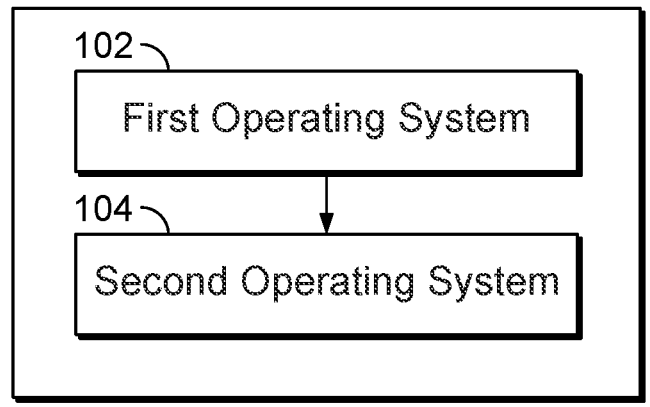
FIG. 1 is a schematic block diagram of an example terminal device for playing media data, in accordance with one or more embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An operating system (OS) is a program responsible for managing computing resources, both hardware and software, at a computing device. As such, an OS generally serves as the core system that services various types of functionalities and features of a computer device.

A device can be configured with a first OS and a second OS, the first OS being configured as the host OS (HOS), and the second OS being configured as the guest OS (GOS). In some embodiments, the first OS is configured as a cloud OS (e.g., Cloud system), which can be implemented by cloud computing technologies such as HFP and HDRDP to the effect of a new generation of general purpose computers at local area networks. On the other hand, the second OS can be implemented by a conventional OS such as Android™, iOS, webOS, and the like. In some embodiments, the first operating system can be implemented as a conventional OS; while the second OS can be implemented as a cloud OS using, for example, container OS techniques such as LXC (Linux Container), Docker, CoreOS, RancherOS, Ubuntu server, Kubernetes, and the like. Upon starting up of a device, the first OS is configured to execute first, and the second OS is configured to execute the next. This way, the first OS is configured to supply the second OS with low level support such as interfaces to device drivers, access to memories, and the like.

However, oftentimes the first OS installed at a device is limited in its capabilities to support media data, e.g., the first OS is only configured to support a limited types of media data. As a result, the device running the first OS is not configured to play media data of all types of media format, causing a user at the device fail to play a certain type of media data.

Techniques for playing of media data on a device are disclosed. A terminal device is equipped with at least two operating systems (e.g., the first OS and the second OS, also referred to as the HOS and GOS). When it is detected that the first OS is not configured to process media data of a particular format, a process request is transmitted to the second OS, which in turn is configured to process the media data and generate the processing results. The processing results are transmitted back to the first OS such that, based on the processing results, the first OS is configured to play the media data. Therefore, the problem of the first OS not supporting media data of all formats is solved, as well as the problem of a terminal device installed with the first OS failing to play media data of all formats.

According to various embodiments of the present disclosure, the first operating system can request the second operating system to assist with processing media data that the first operating system is not able to process to play. As such, the first operating system is enabled to respond to the media data of a media data not supported based on the processing results corresponding to the media data returned from the second operating system. As such, a user is able to enjoy an enhanced multimedia experience by being able to play and interact with all kinds of media data on the device installed with the first operating system and the second operating system, thus avoiding the experience of failing to play certain media data.

FIG. 1 is a schematic block diagram of an example terminal device in accordance with an embodiment of the present disclosure. System 100 can be implemented by, for example, system 1200 of FIG. 12.

System 100 is configured to include a first operating system (OS) 102 and a second operating system (OS) 104. First operating system 102 is configured to send a media processing request to second operating system 104 by invoking calls at communication interfaces. In some embodiments, first operating system 102 is configured at the host OS, and the second operating system 104 is configured as the guest OS.

In this example, upon the starting up of the terminal device, first operating system 102 is configured to execute automatically (e.g., execute as the default OS). When media data is to be played at the terminal device, first operating system 102 is configured to analyze the media data to detect the format the media data is encoded with, details of which are described below. Based on the determined media format, first operating system 102 is configured to determine whether the media format of the media data is supported thereby, e.g., whether first operating system 102 is configured to process the media data of the media format. In this example, when it is determined that first operating system 102 does not support the media format, e.g., is not able to process the media data of the media format, first operating system 102 is configured to make a call to a communication interface (e.g., a configuration command to connect a guest OS to a host OS at a network based interface such as a bridge adaptor interface, bridge service interface, etc.) to start second operating system 104. In some embodiments where second operating system 104 has already been in execution in parallel to first operating system 102, first operating system 102 is configured to directly communicate at a communication interface with second operating system 104. Further, first operating system 102 is configured to generate a processing request based on the media data, and to transmit the processing request to second operating system 104 via the communication interface. Consequently, second operating system 104 is configured to process the media data based on the processing request from first operating system 102. Here, the processing request is generated to include information pertaining to the processing of media data. For example, the information can include the source information of the media data, the parameter information associated with the control identifier of first operating system 102, and the application package information (e.g., application name, etc.) corresponding to the media application which can play the media data.

After receiving the processing request from first operating system 102, second operating system 104 is configured to process the media data to generate processing results. For example, suppose that the media data is specially encoded (e.g., specially compressed and/or encrypted), and the second operating system 104 is configured to decode the media data to generate processing results. Subsequently, the processing results are transmitted back to first operating system 102.

In particular, after receiving the processing request sent by first operating system 102, second operating system 104 is configured to process the media data based on the processing request and generate processing results corresponding to the media data. In implementations, second operating system 104 is configured to retrieve the software development kit (SDK) (e.g., the Intel Media SDK) corresponding to the media data by invoking a call at an interface corresponding to the media application. Using the retrieved SDK, second operating system 104 is configured to process the media data to generate the processing results for the media data. Further details are described below. After generating the processing results for the media data, second operating system 104 is configured to return the generated processing results to first operating system 102. For example, the imagery data, audio data, video data, status data and the like included in the processing results are transmitted to first operating system 102 such that first operating system 102 is configured to play the imagery data, audio data, video data, status, and the like based on the processing results. Thus, first operating system 102 is enabled to support all types of media format and the terminal device is enabled as a general purpose multi-media player.

Here, first operating system 102 is configured to receive the processing results from second operating system 104, after which first operating system 102 is configured to play the media data based on the received processing results in order to respond to the initial request to play the media data.

In this example, after receiving the processing results generated for the media data to be played from second operating system 104, first operating system 102 is configured to respond to the media data based on the processing results. In particular, based on the processing results, first operating system 102 is configured to generate the corresponding playback data to display the media data on a display screen of the terminal device to play the media data. For example, the playback data corresponding to a video clip includes player controls such as playing the video, pausing of the play of the video, fast-forwarding the play of the video, rewinding the play of the video, skipping to playing to another track of the video, repeating the play of the video, and the like.

As used herein, a terminal device refers to a device having multimedia functionality to support media data of audio, video, animation, data, and the like. A terminal device can include a smart phone, a tablet computer, a laptop computer, a desktop computer, a wearable device, an IoT device, an in-vehicle device, a smart appliance (e.g., smart TV), a set-top box (e.g., network based high definition set-top box), and the like. The terminal device is installed with at least two operating systems.

As used herein, media data refers to the data used in the streaming of media content. For example, media data can include video data corresponding to the video typed media, audio data corresponding to the audio typed data, and the like. Here, video data is used to play video clips, and audio data is used to play audio tracks, e.g., a playlist of music.

Figure 2:
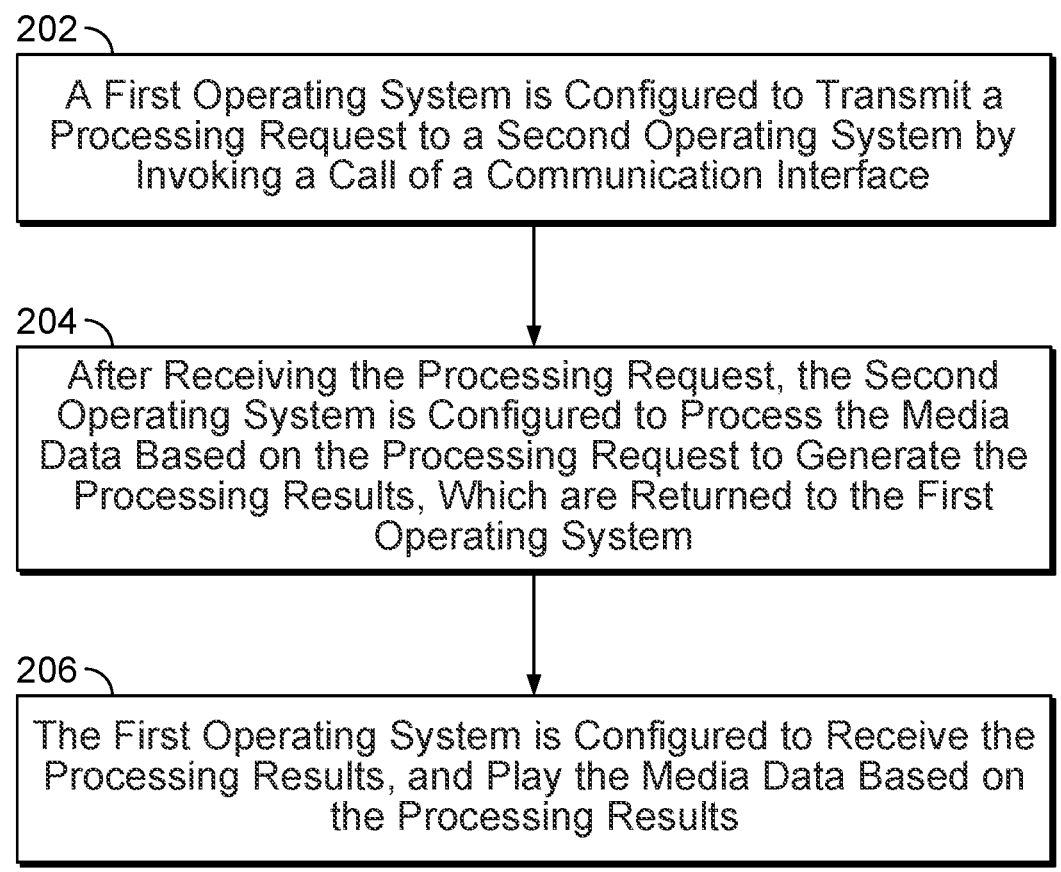
FIG. 2 is a flow chart of an example process for playing media data, in accordance with one or more embodiments of the present disclosure.

FIG. 2 is a flow chart of an example process for playing media data in accordance with an embodiment of the present disclosure. Process 200 can be implemented by, for example, system 100 of FIG. 1, system 300 of FIG. 3, or system 1200 of FIG. 12.

Process 200 starts at 202, where a first operating system is configured to transmit a processing request to a second operating system by invoking a call of a communication interface.

In general, before a terminal device is able to play any media data, the first operating system is first tasked to process the media data, e.g., to decode the media data based on the corresponding media format such that to obtain the playback data corresponding to the media data. Subsequently, based on the playback data, the media data is played to perform the functionality of playing the multimedia content on the terminal device.

In this example, when the first operating system detects that it is not able to process the media data, e.g., the first operating system does not support the media format in which the media data is encoded, the first operating system is configured to communicate with the second operating system. For instance, the first operating system can make a call at a communication interface, e.g., an Inter-Process Communication (IPC) interface, to communicate with the second operating system. Here, the first operating system is configured to transmit a processing request to the second operating system. The processing request, generated by the first operating system according to the media data to be played, includes information pertaining to processing of the media data. In some embodiments, the processing request includes the source information of the media data, control identifiers of the first operating system, and the application package information pertaining to the media application configured to play the media data. The source information of the media data can include a uniform resource locator (URL) corresponding to the media data, or other data pertaining to the media data such as the media label corresponding to the media data, and the like. A media label (e.g., a file extension name, a Multipurpose Internet Mail Extensions (MIME) type, etc.) is used to identify the media format associated with the media data; and the URL is used to retrieve the media data. The control identifiers of the first operating system can be used to establish a two-way communication with the second operating system. The application package information (e.g., application name, etc.) can be used to identify the media application for processing the media data, the media application being used to obtain the SDK corresponding to the media data.

At 204, after receiving the processing request, the second operating system is configured to process the media data based on the processing request to generate the processing results, which are returned to the first operating system.

After receiving the processing request from the first operating system, the second operating system is configured to launch a media application based on the processing request. Here, the media application includes the SDK corresponding to the media data, which can be decoded by the SDK for the purpose of processing the media data. In implementations, the second operating system is configured to launch the media application by invoking a call to the interface corresponding to the media application such that to obtain the SDK corresponding to the media data. The media data is then decoded by use of the SDK to generate the processing results for the media data. In some embodiments, the SDK is used to invoke a call to the interface of a media service module to establish a decoding environment, under which the media data is in turn decoded into decoded data frames. The data frames are used to generate the graphic data corresponding to the media data such that the processing results for the media data can be generated based on the graphic data. Lastly, the processing results are returned to the first operating system by invoking a call to the communication interface. In other words, the processing results are returned in response to the processing request transmitted from the first operating system. As such, the first operating system is configured to play the media data based on the processing results. In some embodiments, the processing results include the second graphic information, the playback status information, and the like. The second graphic information is used to generate the playback data corresponding to the media data in the first operating system, and the playback status information is used to indicate or display the playback status corresponding to the media data to be played, such as the current playback progress, the media data playback time duration, etc.

At 206, the first operating system is configured to receive the processing results, and play the media data based on the processing results.

After receiving the processing results from the second operating system, the first operating system is configured to analyze the processing results to retrieve, for example, the second graphic information associated with the processing results. Next, based on other information related to the playback interface (e.g., a webpage) at which the media data is to be played, the first operating system is configured to generate the first graphic information. Then, by use of a first graphic service module, the second graphic information is synthesized (e.g., combined) into the first graphic information to generate the graphic display data for the first operating system, e.g., the playback data corresponding to the media data, based on which the media data is played. Here, the graphic display data includes the processing results generated by the second operating system, and is used to display a graphic window (e.g., a webpage, etc.) at a graphic interface of a terminal device. For example, a playback page is displayed at the display screen of a terminal device to play the media data.

In general, without a media application providing the first operating system with an interface corresponding to the media application's SDK, the first operating system is not able to retrieve the SDK, e.g., the first operating system is not able to process media data corresponding to the media application using the SDK provided by a third-party application. In other words, the media data format of the media data is not supported at the first operating system. For example, when third party providers, such as video providers and video application developers, do not provide for an interface associated with the SDK during the design and development stage for the first operating system, the first operating system is not able to retrieve the SDK from the third party providers at the afore-described interface. As a result, the first operating system is not able to process the media data provided by the third party applications. However, the third party providers typically provide for interfaces associated with the SDK to correspond to the second operating system, e.g., provide the second operating system with an interface corresponding to the SDK, such that the media application is able to retrieve the SDK on the second operating system. As such, the media application can be installed on the second operating system so that the second operating system can invoke a call to the interface corresponding to the SDK to retrieve the SDK, and utilize the SDK to process the media data to generate the processing results corresponding to the media data. As such, the terminal device is enabled to play the media data based on the processing results such that to implement the media playback functionality.

Figure 3:
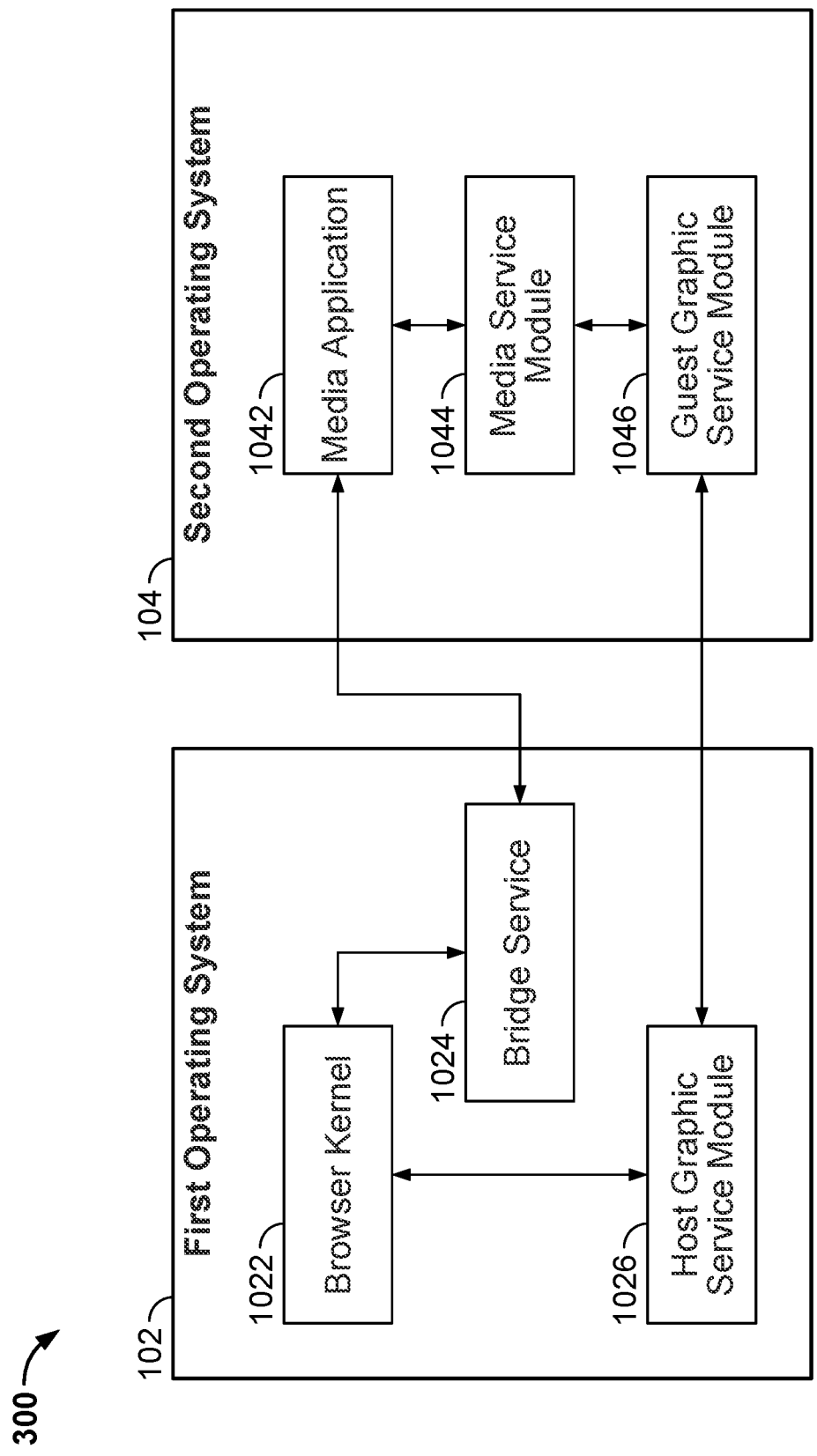
FIG. 3 is a schematic block diagram of another example terminal device for playing media data, in accordance with one or more embodiments of the present disclosure.

FIG. 3 is a schematic block diagram of an example terminal device for playing media data in accordance with an embodiment of the present disclosure. System 300 can be implemented at, for example, system 1200 of FIG. 12. In this example, system 300 is illustrated from the perspective of an Android™ programming platform. It should be understood that any suitable platform can be applied herein to implementing system 300.

System 300 includes a first operating system 302 (e.g., Windows®) and a second operating system 304 (e.g., Android®, Ubuntu, etc.). First operating system 302 includes a browser kernel (e.g., browser engine) 1022, a bridge server (e.g., bridge service module, media bridge service module, etc.) 1024, and a first graphics server (e.g., first graphics service module, a first display server, host display server) 1026. Second operating system 304 includes a media application 1042, a media server (e.g., media service module) 1044, and a second graphics server (second graphics service module, second display server, guest display server) 1046. The functionalities of first operating system 302, second operating system 304, and their respective modules are further described below with reference to FIGS. 4-8.

Figure 4:
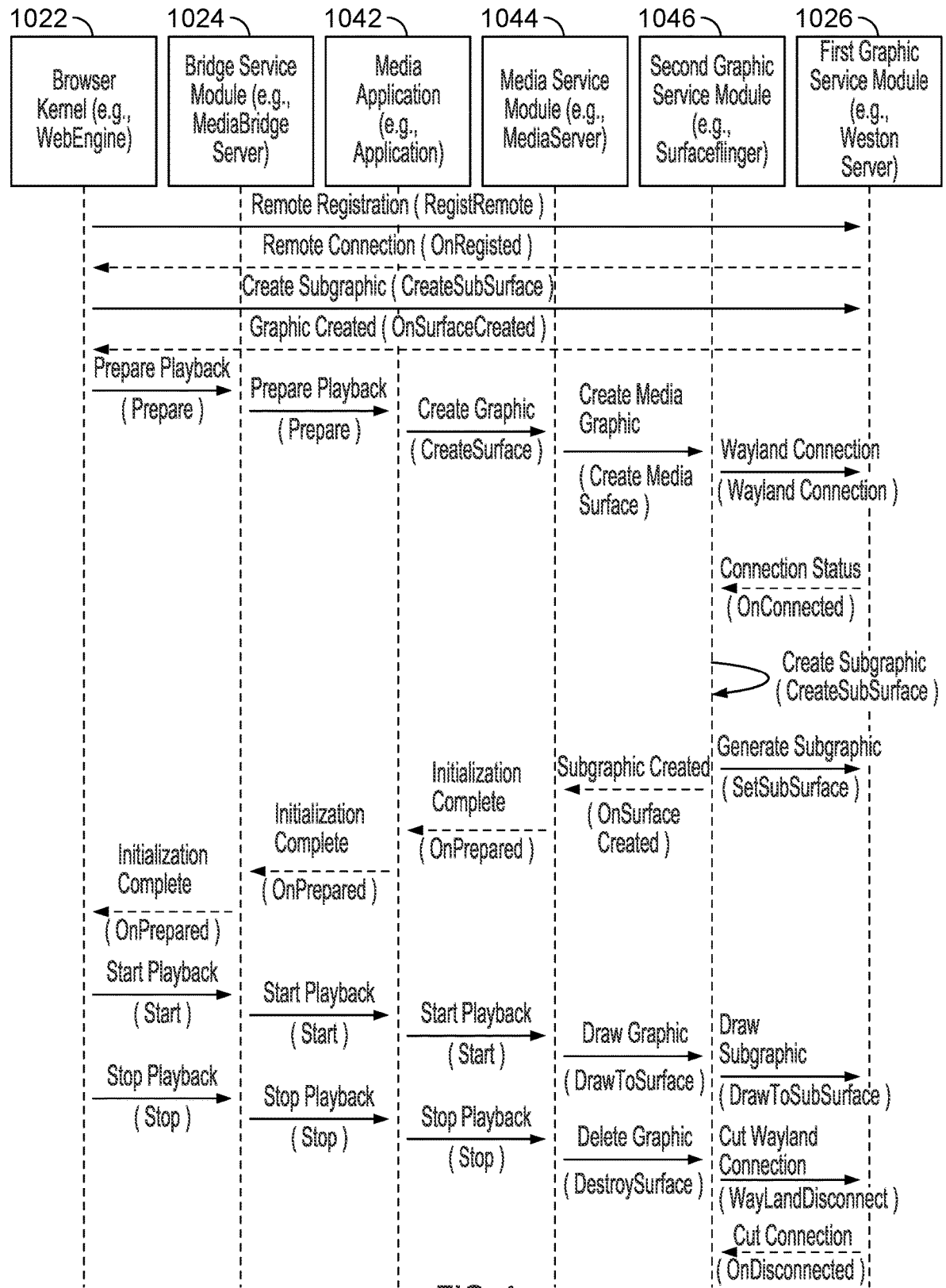
FIG. 4 is an interactive diagram of an example process for playing media data, in accordance with one or more embodiments of the present disclosure.

FIG. 4 is an interactive diagram of an example process for playing media data in accordance with an embodiment of the present disclosure. Process 400 can be implemented at, for example, system 300 of FIG. 3 or system 1200 of FIG. 12.

When first operating system 302 detects that it is not able to process the media data to be played, browser kernel 1022 of first operating system 302 is configured to invoke a call (e.g., an IPC call of RegistRemote) to connect to first graphic service module 1026. Through the remote connection at the interface (e.g., OnRegisted), the playback of the media data can be implemented by creating a second graphic via a call (e.g., CreateSubSurface). As shown herein, in the process of creating a second graphic (e.g., at an interface of OnSurfaceCreated), browser kernel 1022 (e.g., WebEngine) is configured to use bridge service module 1024 (e.g., MediaBridgeServer) to send a prepare for playback message (e.g., a call of Prepare) to media application 1042 (e.g., a playback application) of second operating system 304 to trigger media application 1042 to enter a playback preparation mode. After receiving the prepare for playback message, media application 1042 is configured to send a create graphic message (e.g., a call of CreateSurface) to media service module 1044 (e.g., MediaServer) to trigger media service module 1044 to transmit a create media graphics message (e.g., via a call of CreateMediaSurface) to second graphics service module 1046 (e.g., SurfaceFlinger, etc.). After receiving the create media graphics message, second service module 1046 is configured to establish a display server and client connection (e.g., Wayland connection by invoking a call of WaylandConnection) with first operating system 302 to create a sub-graphic (e.g., via a call of CreateSub Surface) in the connection mode (e.g., at an interface of OnConnected). Subsequently, the generated sub-graphic (e.g., via a call of SetSub Surface) is transmitted to first graphics service module 1026 (e.g., WestonServer) such that a generated second graphic is transmitted to first graphics service module 1026 to cause first operating system 302 to play the media data based on the second graphic.

After establishing a connection with first graphic service module 1026, second graphic service module 1046 is configured to send a create sub-graphic message (e.g., via a call of OnSurfaceCreated) to media service module 1044, which is triggered to transmit an initialization complete message (e.g., via a call of OnPrepared) to media application 1042. After receiving the initialization complete message, media application 1042 is configured to forward the initialization complete message to bridge service module 1024 to cause browser kernel 1022 to retrieve the initialization complete message and to enter into a mode ready to playback the media data. Next, browser kernel 1022 is configured to send start playback message (e.g., via a call of Start) to trigger media service module 1044 to send a draw graphic message (e.g., a call of DrawToSurface) to second graphic service module 1046, which is caused to transmit the generated sub-graphics (e.g., via a call of DrawToSubsurface) to first graphic service module 1026. The generated sub-graphics correspond to the processing result and is played at first operating system 302.

On the other hand, browser kernel 1022 is configured to send a stop playing message (e.g., a call of Stop) to trigger media service module 1044 to send a delete graphics message (e.g., a call of DestroySurface) to second graphic service module 1046, causing second graphics service module 1046 to disconnect from (e.g., a call of WaylandDisconnect) the Wayland connection to first graphics service module 1026. As such, second graphics service module 1046 is disconnected from first graphic service (e.g., enters OnDisconnected mode), and the playback of the media data is stopped.

In some embodiments, browser kernel 1022 of first operating system 302 is configured to generate media playback requests based on inputs of a user's operations. Media playback requests include the source information of the media data to be played. Browser kernel 1022 is also configured to determine the source information of the media data based on the media playback request. For example, browser kernel 1022 is configured to monitor a user event interface at a terminal device to detect a user's operation and to generate an operation request by obtaining the source information corresponding to the user's operation. When it is detected that the source information includes a media label, browser kernel 1022 is configured to set this particular operation request as a media playback request. Further, browser kernel 1022 is configured to detect the source information associated with the media data to determine whether first operating system 302 supports the media data format of the media data. When browser kernel 1022 detects that first operating system 302 does not support the media data format of the media data, it is determined that first operating system 302 is not able to process the media data associated with the media playback request.

Figure 5:
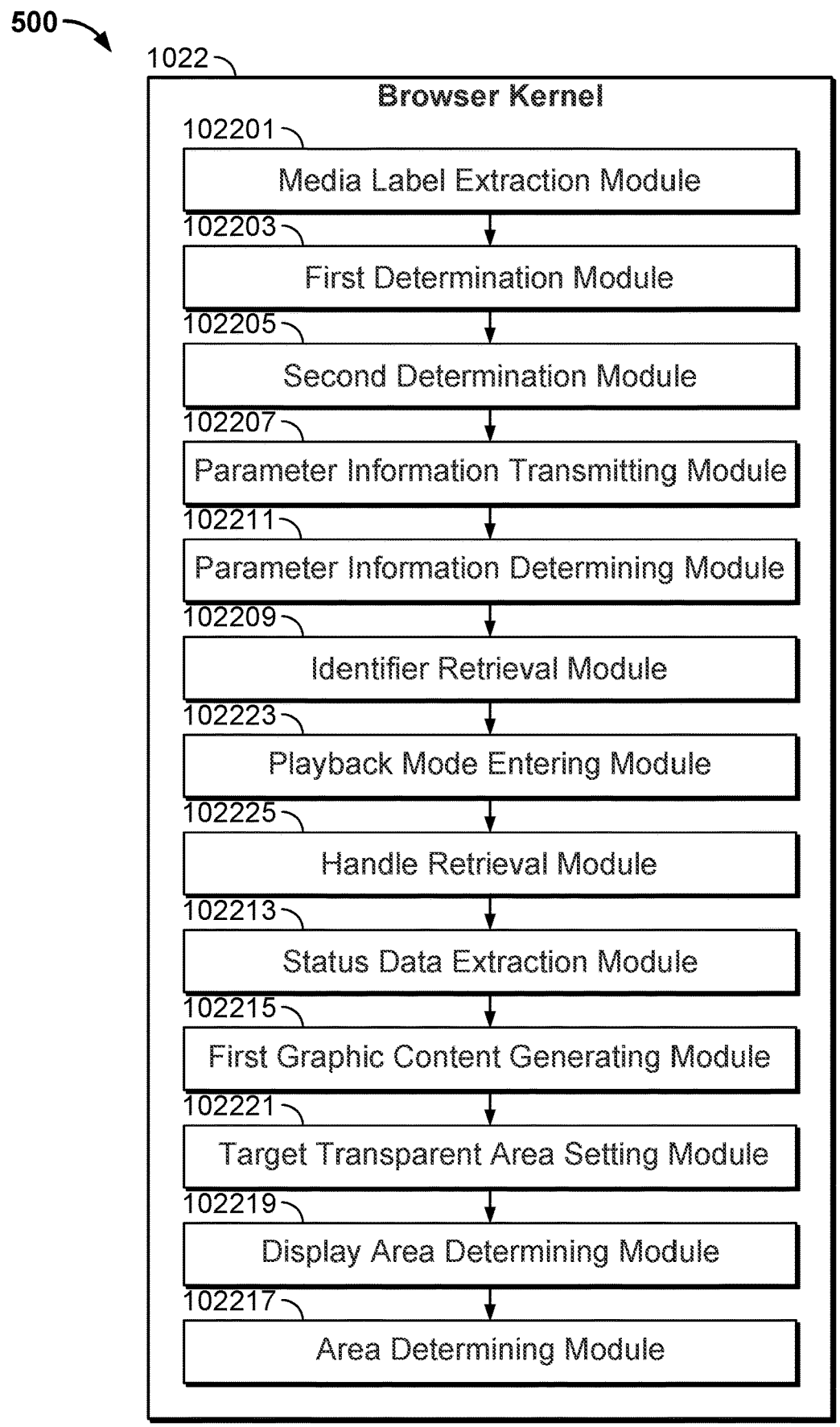
FIG. 5 is a schematic block diagram of an example browser kernel of an example first operating system for playing media data, in accordance with one or more embodiments of the present disclosure.

FIG. 5 is a schematic block diagram of an example browser kernel of an example operating system for playing media data in accordance with an embodiment of the present disclosure. System 500 can implement, for example, browser kernel 1022 of FIG. 3. System 500 can be implemented by, for example, system 1200 of FIG. 12.

System 500 includes a media label extraction module 102201, a first determination module 102203, a second determination module 102205, and a parameter information transmitting module 102207.

Media label extraction module 102201 is configured to extract the media label associated with the media data from the source information.

First determination module 102203 is configured to determine whether the media data is encoded with a pre-configured media data format based on the retracted media label.

Second determination module 102205 is configured to determine, in response to the determination that the media data is not encoded with any pre-configured media format, that a first operating system (e.g., first operating system 102 of FIG. 1, or first operating system 302 of FIG. 3) is not able to process the media data.

Parameter information transmitting module 102207 is configured to transmit the parameter information of the media data to a bridge service module (e.g., bridge service module 1024 of FIG. 3). As a result, the bridge service module is triggered to send a media processing request to a second operating system (e.g., second operating system 104 of FIG. 1, or second operating system 304 of FIG. 3) so that the first operating system is connected to the second operating system. Consequently, the second operating system is configured to process the media data based on the processing request, and the processing results of which is retrieved from the second operating system by the first operating system.

In some embodiments, system 500 further includes an identifier retrieval module 102209 and a parameter information determining module 102211.

Identifier retrieval module 102209 is configured to retrieve a control identifier of the first operating system via a system interface. Here, the control identifier is used to establish a two-way communication between the first operating system and the second operating system.

Parameter information determining module 102211 is configured to include the control identifier and the above-described source information as the parameter information associated with the processing request. In some embodiments, parameter information transmitting module 102207 is used to send the parameter information associated with the processing request to the bridge service module.

In some embodiments, the browser kernel further includes a status data extraction module 102213, and a first graphic content generating module 102215.

Status data extraction module 102213 is configured to extract the playback status data from the status processing results.

First graphic content generating module 102215 is configured to generate the content of the first graphic using the playback status data and the target transparent area. In some embodiments, the first graphic corresponds to the display rendered for playing the media data.

In some embodiments, the browser kernel further includes an area determining module 102217, a display area determining module 102219, and a target transparent area setting module 102221.

Area determining module 102217 is configured to determine the corresponding location and the size of the display area for the second graphic to be displayed on the first graphic based on the handle (e.g., reference of the second graphic).

Display area determining module 102219 is configured to determine the display area of the second graphic on the first graphic based on the determined location and the size of the display area.

Target transparent area setting module 102221 is configured to set the display area as the target transparent area. Taking the Android platform for example, the value associated with the Alpha property of the display area can be set to zero (0) to configure the display area completely transparent.

In some embodiments, the display area includes a target player window. In particular, the browser kernel is configured to use area determining module 102217 to determine the corresponding location and the size of the display area for displaying the second graphic on the first graphic using the handle corresponding to the second graphic. Then, display area determining module 102219 is used to determine the display area for the second graphic on the first graphic. For example, the location of displaying the target player window on the web page and the size of the target player window can be determined. Then, the transparent area setting module 102221 is used to set the display area as the target transparent area such that the first graphic service module is caused to synthesize the second graphic into the first graphic to display the second graphic in the target transparent area, e.g., play the media data in the target player window.

In some embodiments, the browser kernel further includes a playback mode entering module 102223, and a handle retrieval module 102225. The playback mode entering module 102223 is configured to, upon detecting that the status processing results include data of preparation mode, enter the media playback mode based on the data of preparation mode. The handle retrieval module 102225 is configured to, in the media playback mode, retrieve the handle corresponding to the second graphic received at the first graphics service module.

Figure 6:
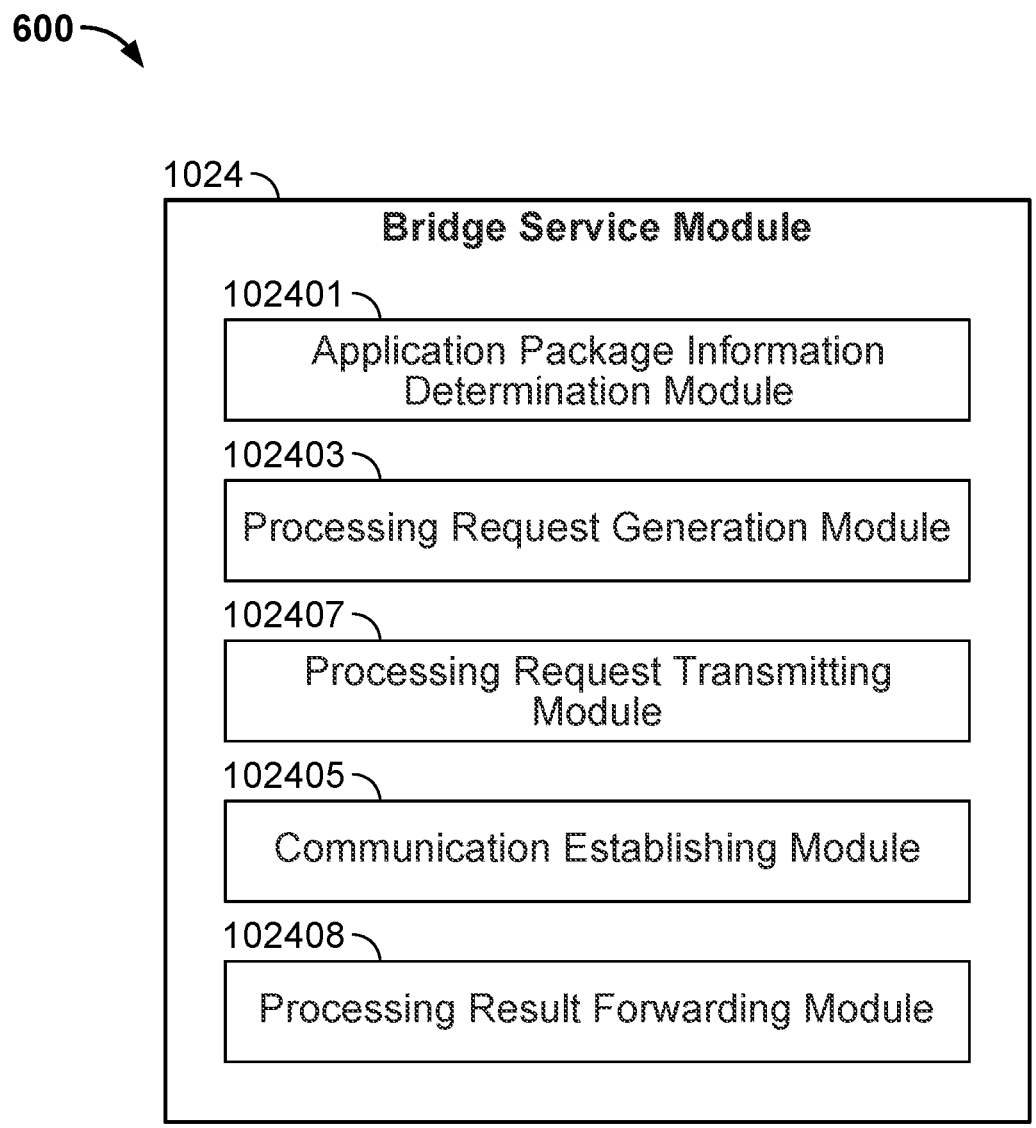
FIG. 6 is a schematic block diagram of an example bridge service module of an example first operating system for playing media data, in accordance with one or more embodiments of the present disclosure.

FIG. 6 is a schematic block diagram of an example bridge service module of an example first operating system (e.g., first operating system 102 of FIG. 1, or first operating system 302 of FIG. 3) for playing media data, in accordance with an embodiment of the present disclosure. System 600 can implement, for example, bridge service module 1024 of FIG. 3.

System 600 is configured to receive the above-described parameter information associated with the processing request, to generate a media processing request based on the parameter information, and to invoke a communication interface to transmit the media processing request to a second operating system (e.g., second operating system 104 of FIG. 1, or second operating system 304 of FIG. 3).

System 600 includes an application package information determination module 102401, and a processing request generation module 102403. Application package information determination module 102401 is configured to extract the source information from the parameter information, based on which the application package information (e.g., package name) is determined. In turn, the media application corresponding to the media data is determined based on the application package information.

Processing request generation module 102403 is configured to generate the processing request based on the parameter information and the application package information.

System 600 is configured to transmit the processing request to the second operating system via a communication interface to trigger the second operating system to launch a media application (e.g., media application 1042 of FIG. 3) corresponding to the application package information based on the media processing request for the purpose of processing the media data.

In some embodiments, system 600 further includes a communication establishing module 102405, and a processing request transmitting module 102407.

Communication establishing module 102405 is configured to invoke a communication interface to establish a two-way communication connection with the second operating system based on the above-described control identifier.

Processing request transmitting module 102407 is configured to transmit the processing request to the second operating system via the two-way communication.

Here, the second operating system can be configured to start the media application (e.g., media application 1042 of FIG. 3) corresponding to the application package information based on the media processing request. The media application is utilized to generate the processing results corresponding for media data in response to the media processing request. In particular, the media application, equipped with a SDK, is configured to retrieve the media data corresponding to the media processing request based on the source information such as the uniform resource locator (URL) of the media data. Then, the media data is processed using the SDK to generate the processing results for the media data. For example, and as further described below, a media service interface can be invoked to create a decoding environment, in which the media data is decoded to generate the processing results.

In some embodiments, the bridge service module is further configured to include a processing result forwarding module 102408. Here, processing result forwarding module 102408 is configured to forward the received status processing results, which are further described below with reference to FIG. 8, to the browser kernel. The browser kernel is further configured used to retrieve the handle corresponding to the second graphic, which is further described below with reference to FIG. 8, received at the first graphics service module based on the status processing results. Based on the handle, a target transparent area is determined such that the content of the first graphic is generated based on the target transparent area. Next, the generated content of the first graphic is sent to the first graphic service module, which in turn generates the first graphic based on the content of the first graphic. Then, the second graphic is displayed in the target transparent area of the first graphic such that to play the media data.

In particular, in order to play the media data based on the status processing results, the browser kernel is configured to analyze the status processing results to determine the following: if it is detected that the status processing results indicates a preparation status (e.g., including data of a preparation mode), the browser kernel is configured to enter the media playback mode, e.g., a mode in preparation for playing the media data. Under the playback mode, the handle of the second graphics received at the first graphic service module is retrieved. Then, the corresponding display location and the size of the display area for displaying the second graphic on the first graphic is determined based on the handle. In other words, the display area of the second graphic on the first graphic is determined and set as the target transparent area. Further, the browser kernel is configured to extract the playback status data from the status processing results, and use the playback status data and the target transparent area to generate the content of the first graphic. The generated content of the first graphic is then transmitted to the first graphic service module, which is in turn triggered to generate the first graphic, display the second graphic in the target transparent area of the first graphic such that to play the media data.

Figure 7:
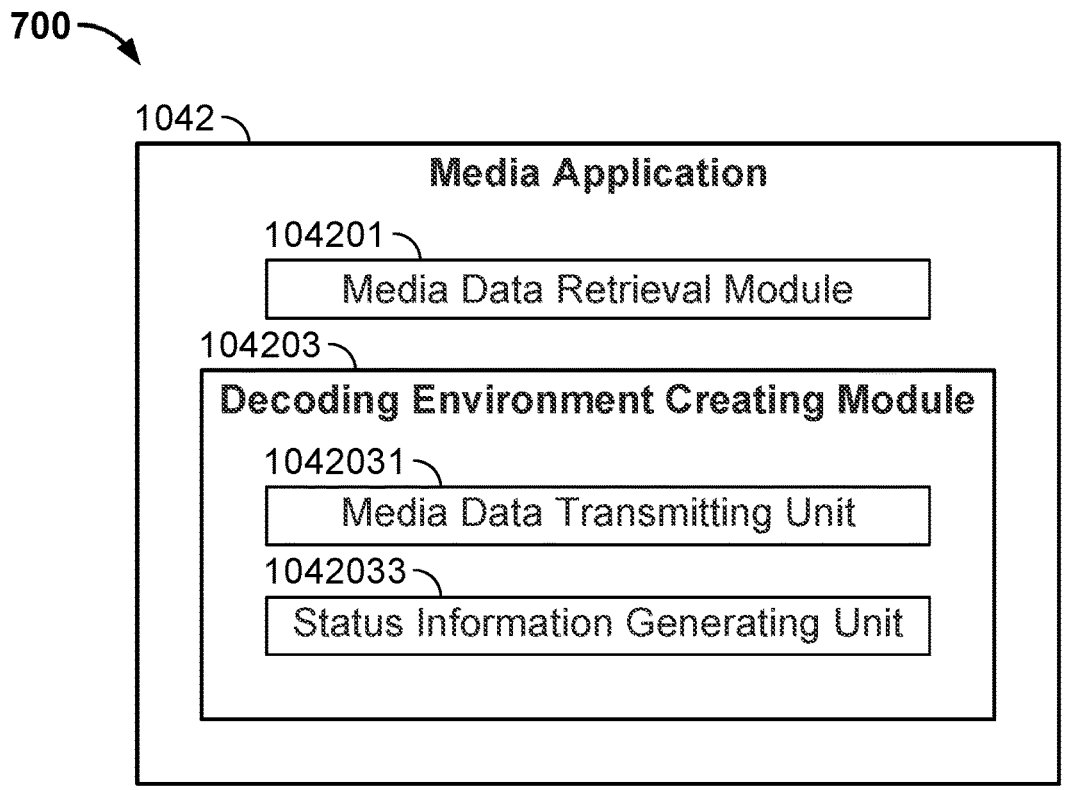
FIG. 7 is a schematic block diagram of an example media application of an example second operating system for playing media data, in accordance with one or more embodiments of the present disclosure.

FIG. 7 is a schematic block diagram of an example media application of an example second operating system (e.g., second operating system 104 of FIG. 1 or second operating system 304 of FIG. 3) in accordance with an embodiment of the present disclosure. System 700 can implement, for example, media application 1042 of FIG. 3.

System 700 includes a media data retrieval module 104201, and a decoding environment creating module 104203.

Media data retrieval module 104201 is configured to retrieve the media data corresponding to the processing request based on the source information.

Decoding environment creating module 104203 is configured to invoke a media service interface to create a decoding environment, under which the media data is decoded to generate the processing results. In some embodiments, decoding environment creating module 104203 is further configured to invoke the media interface to send the retrieved media data to a second media service module (e.g., second media service module 1044 of FIG. 3), which is triggered to decode the media data.

In some embodiments, decoding environment creating module 104203 further includes a media data transmitting unit 1042031. Media data transmitting unit 1042031 is configured to transmit the retrieved media data to the second media service module via the media interface.

The second media service module is configured to, after receiving the media data, decode the media data to generate data frames, which are in turn transmitted to a second graphic service module (e.g., second graphics service module 1046 of FIG. 3).

The second graphic service module is configured to, after receiving the data frames, to synthesize the data frames to generate the second graphic information, which is set as the processing result.

In some embodiments, decoding environment creating module 104203 is configured to further include a status information generating unit 1042033. Status information generating unit 1042033 is configured to analyze the media data using the SDK to generate the playback status information, which is set as the status processing results. Here, the playback status information can be used to indicate the playback status corresponding to the media player on a display interface of a terminal device. For example, the playback status information can include the progress of the current playback, the time of the playback of the media data, etc. The time of the playback of the media data as used herein refers to the amount of time it takes to play the media data in its entirety, e.g., a video playback time of 50 minutes indicates that it takes 50 minutes to play the video from the start to the end.

In this example, decoding environment creating module 104203 is configured to send a processing request via the media interface to the second media service module (e.g., media service module 1044 of FIG. 2). Once the second media service module accepts the processing request, decoding environment creating module 104203 is configured to use media data transmitting unit 1042031 to send the obtained media data to the second media service module. As a result, the second media service module is caused to decode the media data to generate decoded data frames, which are transmitted to the second graphic service module (e.g., second graphic service module 1046 of FIG. 3) for synthesizing.

Here, the second graphic service module is configured to synthesize the data frames into the second graphic information, which is set as the processing results. The details are described further with reference to FIG. 8 below.

Figure 8:
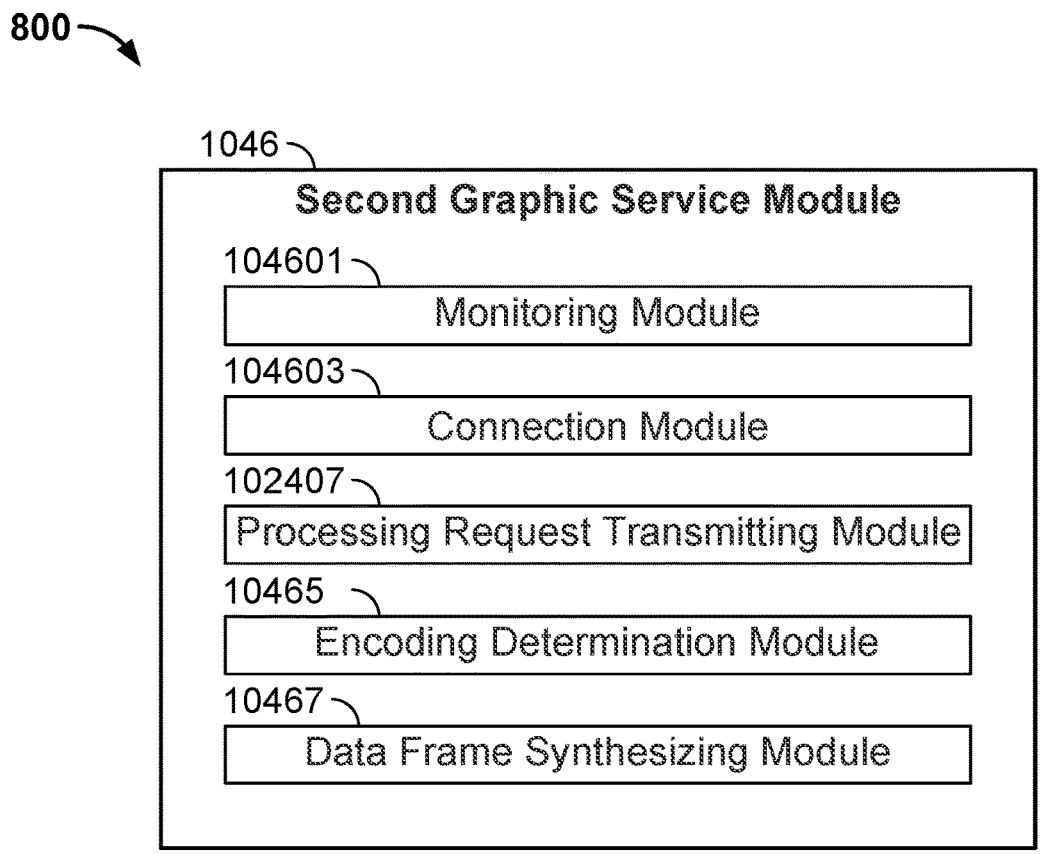
FIG. 8 is a schematic block diagram of an example second graphics service module of an example second operating system for playing media data, in accordance with one or more embodiments of the present disclosure.

FIG. 8 is a schematic block diagram of an example second graphic service module of an example second operating system (e.g., second operating system 104 of FIG. 1 or second operating system 304 of FIG. 3) in accordance with an embodiment of the present disclosure. System 800 can implement, for example, second graphics service module 1046 of FIG. 3.

The second graphic service module is configured to synthesize the decoded data frames to generate the second graphic information, and set the second graphic information as the processing results.

In particular, the second graphic service module is configured to monitor an interface corresponding to detecting control identifiers. When the control identifier of the first operating system (e.g., first operating system 102 of FIG. 1 or first operating system 302 of FIG. 3) is detected, the second graphic service module is configured to connect to the first graphic service module (e.g., first graphic service module 1026 of FIG. 3) of the first operating system based on the control identifier thereof. Next, the second graphic service module is configured to synthesize the decoded data frames into the second graphic and to generate the second graphic information. This second graphic information includes the second graphic and the handle information corresponding to the second graphic. In some embodiments, the handle is used to control the size of the display area and the display location for the second graphic.

System 800 includes a monitoring module 104601, and a connection module 104603.

Monitoring module 104601 is configured to monitor an interface corresponding to control identifiers.

Connection module 104603 is configured to, upon detecting the control identifier of the first operating system, connect to the first graphic service module of the first operating system based on the control identifier.

In this example, when the control identifier of the first operating system is detected upon the above-described monitoring, the data frames received are determined to be generated in response to the processing request from the first operating system. Further, it is determined that the data frames are encoded with a particular media format, and the data frames are synthesized into the second graphic and the handle corresponding to the second graphic. Next, using connection module 104603, a communication connection is established with the first graphic module of the first operating system based on the control identifier such that the generated second graphic and the handle corresponding to the second graphic is transmitted to the first graphic service module. As such, the first operating system is enabled to generate the playback data corresponding to the media data based on the second graphic and the handle thereof, which is used to performing the playback control upon the media data in the first operating system.

In some embodiments, the second graphic service module is further configured to include an encoding determination module 10465, and a data frame synthesizing module 10467.

Encoding determination module 10465 is configured to, upon detecting the control identifier of the first operating system during the above-described monitoring, determine that the data frames are encoded with a particular media format.

Data frame synthesizing module 10467 is configured to synthesize the data frames to generate the second graphic and the handle corresponding to the second graphic.

Figure 9:
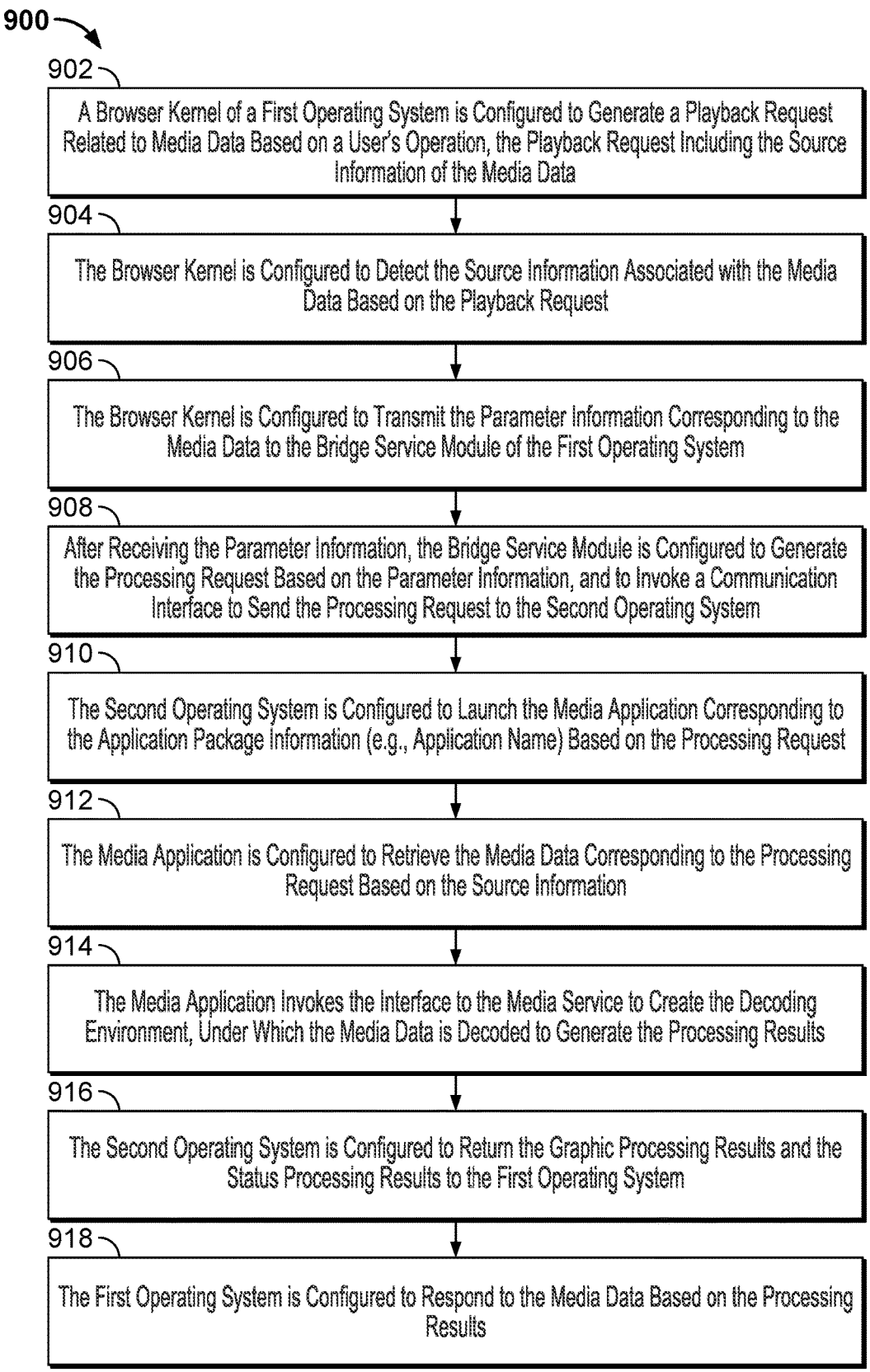
FIG. 9 is a flow chart of an example process for playing media data, in accordance with one or more embodiments of the present disclosure.

FIG. 9 is a flow chart of an example process for playing media data, in accordance with an embodiment of the present disclosure. Process 900 can be implemented by, for example, system 1200 of FIG. 12.

Process 900 starts at 902, where a browser kernel of a first operating system is configured to generate a playback request related to media data based on a user's operation. The playback request includes the source information of the media data.

In this example, a user operates a terminal device to select for the media to view or interact with at the terminal device. Here, the user can interact with a browser executing in a first operating system installed on the terminal device to select for particular media content. For example, the user can click on a video, e.g., visiting a web page (e.g., an HTML5-based web page) that includes a video. Based on the user's operation, e.g., the click operation input by the user, the browser executing in the first operating system retrieves the media source information corresponding to the user's operation. For instance, the browser is configured to retrieve the URL information corresponding to the user's operation, and use the URL information as the media source information, which is used to generate a processing request. Here, the URL information can include the information such as the communication mode (e.g., the protocol), the server information (e.g., the server's IP address), the path, the file name, and the like. For example, the data format of the URL information can be specified as "protocol://UserName: password@Subdomain.Domain.TopLevelDomain:Port-Number/Directory/FileName.FileExtensio n?Parameter=Value#ID." When the media source information includes a media label, e.g., the retrieved URL information includes the file extension information corresponding to the media data, the browser kernel is configured to determine the operation request as a media playback request, and set the media source information in the playback request as the source information of the media data. The source information corresponding to the media data includes the information such as the media label (e.g., a video tag in the form of <video> and </video> as specified in the HTML5 standard), file name information, the communication protocol, and the like.

At 904, the browser kernel is configured to detect the source information associated with the media data based on the playback request.

When the operation request is determined as a playback request, the browser kernel is configured to detect the source information included in the playback request to respond to the playback request. In particular, the browser kernel decodes the media data according to the media data format thereof to generate the playback data corresponding to the media data. As such, the media data is played with playback controls based on the playback data, e.g., in response to the playback request corresponding to the user's operation. The browser kernel is configured to extract the media table corresponding to the media data from the source information, which is used to determine the media data format of the media data. As such, it is determined whether the media data is encoded with a preset data format, e.g., whether the first operating system is able to process the media data of this media format.

In some embodiments, the detection of the source information of the media data by the first operating system includes the following sub-steps.

At sub-step 1, the browser kernel is configured to retrieve the media label corresponding to the media data from the source information.

Based on the media label retrieved, the media data format corresponding to the media data is determined such that it is also determined whether the first operating system supports the media data format corresponding to the media data. In implementations, the extracting of media label from the source information can be performed by configuring the browser kernel to extract the video tag from the URL information associated with a web page visited by the user. Thus, the media data format corresponding to the media data is determined based on the properties specified under the tag of "data-from" associated with the video tag.

At sub-step 2, it is determined whether the media data is decoded with a pre-configured data format based on the media label.

In implementations, the first operating system is pre-configured with the media formats it supports. In other words, the media data of pre-configured media formats are playable by the first operating system. For example, a Host OS player can be pre-configured to execute on the host operating system (e.g., first operating system) to play video in the Flash Video format (FLV format). The browser kernel is configured to determine the media data format corresponding to the media data based on the media label such that to determine whether the media data is encoded with a preset media format. In this example, when the media data is determined as encoded in the preset media format, e.g., the media data is encoded in the FLV format, the media data is determined to be encoded with a media format supported by the Host OS player. In other words, the Host OS player can be used to process the media data of the media format. For another example, for media data encoded with a media format other than FLV format, e.g., Quick Sync Video (QSV), RealMedia, Windows Media Video, AVI, etc., the media data format corresponding to the media data is not determined as a preset media format supported by the Host OS player. As a result, the Host OS player is not able process the media data. Here, the QSV format is a video file format developed by a third party provider. A guest OS player executing on a Guest OS is needed to process video data encoded in the QSV format.

At sub-step 3, when the media data is determined as not encoded with a preset media format, it is determined that the first operating system is not able to process the media data.

In this example, when the media data is determined as not encoded with a preset data format, the browser kernel is configured to determine that the first operating system is not able to process the media data. In other words, while the Host OS player is not able to decode and process the media data, the Guest OS player can be invoked to decode and process the media data.

At 906, the browser kernel is configured to transmit the parameter information corresponding to the media data to the bridge service module of the first operating system.

In this example, when it is determined that the first operating system is not able to process the media data, a processing request is transmitted to a second operating system. In particular, upon determining that the first operating system is not able to process the media data, the browser kernel is configured to connect to the second operating system via the bridge service module. As such, the second operating system is triggered to process the media data to generate the processing results, which are in turn retrieved from the second operating system. In implementations, the browser kernel is configured to retrieve the control identifier of the first operating system (e.g., the ClientId of the first operating system) via a system interface. Next, the retrieved source information and the control identifier of the first operating system are set as the parameter information, which are transmitted to the bridge service module such that the bridge service module is triggered to send a processing request to the second operating system. The media processing request includes information related to the processing of the media data such as the source information of the media data, the application package information, and the like. Here, the application package information (e.g., package name) can be determined based on the source information of the media data. The application package information is then used to determine the media application that the media data can be processed with.

In implementations, the browser kernel (e.g., WebEngine) is configured to retrieve the ClientId of the first operating system through the interface provided by, for example, Weston (e.g., a Wayland compositor). The retrieved ClientId and the URL information of the media data are set as the parameter information associated with the media data, which are transmitted to the bridge service module (e.g., MediaBridgeService). In some embodiments, the first operating system connects to the second operating system via a socket based connection.

At 908, after receiving the parameter information, the bridge service module is configured to generate the processing request based on the parameter information, and to invoke a communication interface to send the processing request to the second operating system.

The parameter information is transmitted to the second operating system such that the second operating system is triggered to launch the media application corresponding to the application package information. As such, the media application in execution creates a decoding environment, under which the media data is decoded to generate the processing results for the media data. For example, after the bridge service module (e.g., MediaBridgeService) receives the parameter information, with a call to an IPC interface, the bridge service module transmits an IPC message to the second operating system. The IPC message includes the information as the application package information, URL information, ClientId, and the like. In other words, a processing request is transmitted to the second operating system.

In some embodiments, the bridge service module is configured to generate a processing request based on the parameter information by following sub-steps.

At sub-step 1, the source information is extracted from the parameter information such that to determine the application package information, which is in turn used to determine the media application with which the media data can be processed.

In some embodiments, the bridge service module is configured to extract the source information corresponding to the source information identifier based on a preset source information identifier. Then, the application package information is determined based on the extracted source information. The application package information (e.g., application name) can be used to determine the media application with which the media data can be processed. For example, when the media data is video, the application package information can be used to launch a video application in the second operating system. Here, the video application can be used to create the sub-graphic (e.g., Surface) and media player based on a third-party SDK.

At sub-step 2, the parameter information and application package information is included to generate the processing request.

In some embodiments, the bridge service module is configured to use the parameter information from the browser kernel to determine the application package information such that to generate the processing request. The processing request is then transmitted to the second operating system by invoking a communication interface, e.g., a call to the IPC interface, to trigger the second operating system to launch the media application corresponding to the application information based on the media processing request.

In some embodiments, the bridge service module is configured to transmit the media processing request to the second operating system via a communication interface by the following sub-steps.

At sub-step 3, a two-way communication connection is established via the communication interface and based on the control identifier.

In this example, the bridge service module is configured to extract the ClientId of the first operating system from the parameter information. Then, via a call to the IPC interface, a two-way communication connection is established with the second operating system based on the ClientId of the first operating system. In particular, the bridge service module is configured to call the IPC interface to establish a socket connection with the media application running in the second operating system based on the ClientId of the first operating system, thus enabling communication based on the socket connection.

At sub-step 4, the media processing request is transmitted to the second operating system over the two-way communication connection.

In particular, the bridge service module is configured to send the processing request to the second operating system using two-way communication connection to trigger the second operating system to process the media data. For example, prior to the media application being started in the second operating system, the processing request is used to trigger the second operating system to launch the media application corresponding to the application package information so that the media application is caused to call a preparation interface (e.g., ApplicationPrepare), at which the media data is prepared for playing back.

At 910, the second operating system is configured to launch the media application corresponding to the application package information (e.g., application name) based on the processing request.

After receiving the processing request from the bridge service module, the second operating system is configured to extract the application package information from the processing request. For example, based on pre-configured application parameter identifiers (e.g., application name identifiers), the application package name corresponding to an application parameter identifier is extracted from the processing request. Thus, the media application with which the media data can be processed is determined based on the application name. In this example, the second operating system is configured to respond to the processing request from the first operating system by launching the application. In other words, the media application is configured to respond to the processing request to generate the processing results corresponding to the media data. In particular, the media application includes a SDK, which is obtained by the second operating system at an interface of the SDK. The SDK is used to decode the media data to generate the processing results for the media data. For example, a decoding environment is created by invoking an interface to a media service such that, the media data is decoded to generate the processing results. Details on the decoding environment are further described below.

At 912, the media application is configured to retrieve the media data corresponding to the processing request based on the source information.

In implementations, after launching, the media application enters a mode in preparation for playback. For example, after a video application is launched, the video corresponding to the processing request can be retrieved based on the source information of the video data such as the URL at which the video is available. As such, the sub-graphic (e.g., Surface) can be created based on the video, and a media player is created based on a third-party SDK such that to enter the mode in preparation mode for video playback.

At 914, the media application invokes the interface to the media service to create the decoding environment, under which the media data is decoded to generate the processing results.

In some embodiments, once entering the mode in preparation to playback, the media player is configured to connect to the second media service module by invoking an interface at the media service, e.g., the multimedia server (e.g., MediaServer). Using the media service module, the retrieved media data is decoded, e.g., a decoding environment is initialized to decode the media data to generate the decoded data frames. Taking the Intel Media SDK for example, in order to setup a decoding environment, a Media SDK session is initialized and parameters pertaining to the decode/encode/vpp processing are set according to the parameter information included in the processing request. For instance, the input media format, the output media format, input resolution, output resolution, frame rate, and the like are required for various stages of processing. After the data frames are generated, the second media service module is configured to transmit the generated data frames to the second graphic service module of the second operating system (e.g., SurfaceFlinger in Android®), which is configured to synthesize the decoded data frames into a graphic to generate the processing results corresponding to the media data. As such, the graphic can be displayed at a display interface of a terminal device.

In some embodiments, the media application is configured to create the decoding environment via the media service interface, and to decode the media data to generate the processing results by the following sub-steps.

At sub-step 1, the media application is configured to transmit the retrieved media data to the second media service module via the media interface.

In this example, the media application is configured to connect to the media server (e.g., multimedia server Media-Server) of the second operating system via the media interface (e.g., MediaServer) such that to send the retrieved media data to the media server, which is in turn triggered to decode the media data.

At sub-step 2, after receiving the media data, the second media service module is configured to decode the media data to generate the decoded data frames, which are transmitted to the second graphic service module.

In this example, after receiving the media data from the media application, the second media service module is configured to decode the media data (e.g., video data, or audio data) to generate decoded data frames. After the media player is initialized, e.g., when the media data is to be played, the second media service module is configured to transmit the decoded data frames to the second graphic service module of the second operating system (e.g., SurfaceFlinger of the second operating system) to synthesize the decoded data frames. For example, during the course of playing a video, MediaServer of the second operating system is configured to send the decoded data frames to SurfaceFlinger of the second operating system, which is triggered to synthesize these data frames and generate the second graphic information.

At sub-step 3, after receiving the data frames, the second graphics service module is configured to synthesize the data frames to generate the second graphic information, which is set as the processing results.

In particular, after receiving the data frames and at the time graphic tags are created, the second graphic service module is configured to determine whether the control identifier of the first operating system is detected on the interface corresponding to control identifiers. If not, it is determined that the graphic information is generated for playing the corresponding media data in the second operating system. Otherwise, first graphic service module of the first operating system is connected via the system interface (e.g., WaylandConnection) using the control identifier of the first operating system as a parameter. After connecting to the first graphic service module of the first operating system, the decoded data frames are synthesized to generate the second graphic information, which is set as the graphic processing results to be transmitted to the first graphic service module.

In some embodiments, the second graphic service module is configured to monitor the control identifier interface (e.g., ClientId) to detect whether there is a value associated therewith. If a call to the ClientId interface returns an empty value, it is determined that the graphic information is generated for the second operating system (e.g., Guest OS) to play the media data. Otherwise, the control identifier of the first operating system is used as a parameter to establish connection to the display server (e.g., WestonServer) of the first operating system via the interface such as Wayland-Connection.

In some embodiments, after receiving the decoded data frames, the second graphic service module is configured to compose the data frames to generate the second graphic information includes to determine, upon detecting the control identifier of the first operating system from the monitoring, that the data frames are encoded with a particular format. Further, the second graphic service module is configured to synthesize the data frames to generate the second graphic, and the handle corresponding to the second graphic.

In particular, when detecting the control identifier of the first operating system from monitoring the corresponding interface, the second graphic service module is configured to determine whether the data frames received are the data frames generated in response to a media processing request from the first operating system. As such, it is also determined whether the data frames are encoded with a particular media format. After it is determined that that the data is encoded with a particular format, the second graphic service module is configured to synthesize the data frames according to the particular encoding format to generate the second graphic, and the handle corresponding to the second graphic. Here, the handle corresponding to the second graphic is used to control attributes of the second graphic such as the size of the display area, the location of the display area, and the like. For example, when SurfaceFlinger of the second operating system detects the control identifier (e.g., ClientId) of the first operating system, SurfaceFlinger is configured to determine whether the received data frames are encoded with a particular format based on the values of the attributes such as VideoView. Based on the determined particular format, SurfaceFlinger is configured to synthesize the data frames to generate the sub-graphic (e.g., Sub Surface), and the handle texture corresponding to the sub-graphic. The handle texture is used to control the size of the display area (e.g., Size), and the display location of the sub-graphic.

At sub-step 4, the media application is configured to use the corresponding SDK to decode the media data to generate the playback status information, which is set as the status processing results.

After creating the media player, the media application of the second operating system is further configured to decode the media data using the corresponding SDK to generate the playback status information for the media player based. The playback status information includes, for example, the data in preparation mode, and the data in playback mode. Here, the data in preparation mode refers to the data generated during the stage of initializing the media player, including information indicating statuses such as initialization being started, initialization being complete, etc. In other words, the data in preparation mode indicates the current status of the media player during the preparation mode. The data in playback mode refers to the data generated during the process of the media player playing the media data, including information indicating statuses such as the current playback progress, the media playback time, etc. The media application is configured to set the media player's playback status information as the status processing results.

At 916, the second operating system is configured to return the graphic processing results and the status processing results to the first operating system.

In particular, the second operating system is configured to send the afore-described status processing results to the bridge service module using the media application. The second operating system is also configured to send the graphic processing results to the first graphic service module using the second graphic service module. In this example, the media application of the second operating system is configured to send the status processing results to the bridge service module (e.g., MediaBridgeService) of the first operating system via an IPC interface. Further, the graphic server (e.g., SurfaceFlinger) of the second operating system is configured to send the graphic processing results to the display server (e.g., WestonServer) of the first operating system via the WaylandConnection interface. As such, the graphic processing results are transmitted to the first operating system using the two-way communication connection established by, for example, the Wayland protocol. For example, the handle corresponding to the sub-graphic is transmitted to the first graphic service module of the first operating system via the Wayland protocol based communication connection.

At 918, the first operating system is configured to respond to the media data based on the processing results.

In particular, the first operating system receives the status processing results from the second operating system via the bridge service module, and the graphic processing results from the second operating system via the graphic service module. After receiving the status processing result, the first operating system is configured to use the browser kernel to retrieve the status information from the processing results. If it is detected that the status processing results include the data in preparation mode, the media playback mode is accordingly entered based on the status data. Based on the media player's playback mode, the first operating system is configured to use the browser kernel to retrieve the handle corresponding to the second graphic received at the first graphic service module. Further, based on the handle, a target transparent area, which is in turn used together with other content of the interface (e.g., web page) to generate the content of the first graphic, e.g., the first graphic information. Using the first graphic service module, the first graphic is generated based on the first graphic information, the second graphic is configured at the transparent area of the first graphic to generate the merged graphic. As such, the second graphic is displayed in the target transparent area of the first graphic to play the media data.

In some embodiments, the first operating system is configured to playback the media data based on the processing results by the following sub-steps.

At sub-step 1, the bridge service module is configured to forward the received status processing results to the browser kernel.

In this example, after receiving the status processing results from the second operating system, the bridge service module is configured to forward the received status processing results to the browser kernel, which is triggered to detect the status from the status processing result to playback the media data in the first operating system.

At sub-step 2, based on the status processing results, the browser kernel is configured to retrieve the handle corresponding to the second graphic received at the first graphic service module. Based on the handle, the target transparent area is determined and used to generate the content of the first graphic to be sent to the first graphics service module.

In this example, the browser kernel is configured to retrieve the handle corresponding to the second graphic received at the first graphic service module by entering a media data playing mode upon detecting the data in preparation mode in the status processing results. In the playing mode, the browser kernel is configured to retrieve the handle corresponding to the second graphic that is received at the first graphic service module.

In particular, the browser kernel is configured to detect and retrieve from the status processing results the status data generated by the media application for the media data to be played. When the status data retrieved is identified as the data in preparation mode, e.g., the status processing results include the data in preparation mode, it is determined that the media application running in the second operating system has entered the stage in preparation for playing the media data. Thus, the browser kernel is configured to enter a media playback stage in preparation to play the media data. In the media playback stage, the browser kernel is configured to retrieve the handle received at the first graphic service module via the interface corresponding to the first graphic service module. For example, the browser kernel (e.g., Webengine) is configured to use the graphic server module (e.g., WestonServer) to retrieve the handle texture of the sub-graphic (e.g., Sub Surface).

In some embodiments, the browser kernel is configured to determine the target transparent area based on the handle includes determining the location and the size of the display area for displaying the second graphic on the first graphic based on the handle. The display area is designated as the target transparent area.

In particular, based on the handle, the browser kernel is configured to determine the size of the display area for displaying the second graphic on the first graphic. For example, the size of the player window corresponding to the second graphic is determined. Also, the location for displaying the second graphic on the first graphic is determined. For example, the location of the player window displayed in the web page is determined. With the determined size of and location of the display area, an area (e.g., a rectangular area) is determined and designated as the area to display the second graphic on the first graphic. Further, the area is designated as the target transparent area in the first graphic, in which the second graphic is displayed in the first graphic to play the media data in the first operating system. Here, the display area can include a target player window, a web player window, and the like. In some embodiments, a target player window is the player window in which the media application is currently executing.

In this example, prior to generating the content of the first graphic for the target transparent area, the browser kernel is further configured to retrieve the status data from the status processing results. The status data together with the target transparent area are used to generate the content of the first graphic. In some embodiments, the content of the first graphic is transmitted to the first graphics service module, which in turn is configured to compose the content of the first graphics into the first graphic.

At sub-step 3, the first graphic service module is configured to generate the first graphic based on the content of the first graphic, and display the second graphic in the target transparent area of the first graphic to play the media data.

After receiving the content of the first graphic, the first graphic service module is configured to generate the first graphic based on the content of the first graphic. Further, the second graphic received from the second graphic service module is merged into the target transparent area of the first graphic to generate a synthesized graphic, in which the second graphic is displayed at the target transparent area of the first graphic. Afterwards, the first operating system of the terminal device is configured to display the synthesized graphic at a display interface such that to play the media data. As such, the terminal device is enabled to play the type of media data that is not supported by the first operating system (e.g., Host OS).

Figure 10:
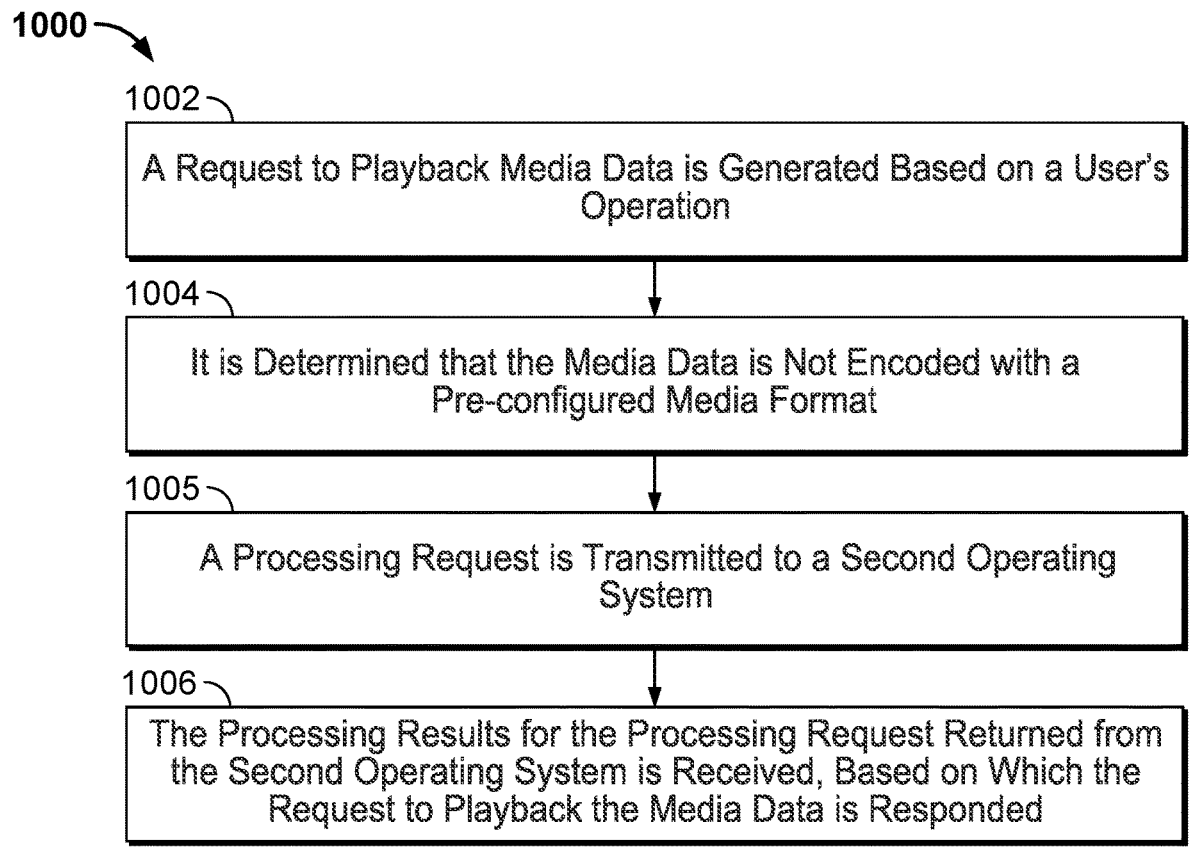
FIG. 10 is a flow chart of another process for playing media data, in accordance with one or more embodiments of the present disclosure.

FIG. 10 is a flow chart of another example process for playing media data, in accordance with an embodiment of the present disclosure. Process 1000 can be implemented by, for example, system 1200 of FIG. 12.

Process 1000 starts at 1002, where a request to playback media data is generated based on a user's operation.

At 1004, it is determined that the media data is not encoded with to a pre-configured media format.

At 1005, a processing request is transmitted to a second operating system in response to the determination.

At 1006, the processing results for the processing request returned from the second operating system is received, based on which the request to playback the media data is responded.

In some embodiments, the media player executing in the first operating system is configured to receive a user's operations and generate requests to playback media data based on the user operations. The request to playback media data includes the source information of the media data. In particular, by detecting the source information of the media data, it is determined whether the media data is encoded with a pre-configured media format, e.g., whether the first operating system is able to process the media data. When it is determined that the media data is not encoded with a pre-configured media format, the media player is configured to generate a processing request with respect to the media data, which is transmitted to the second operating system. Subsequently, the processing results with respect to the processing request are received from the second operating system. Based on the processing results, the request to playback the media data is responded. In other words, with the second operating system assisting in decoding the media data that the first operating is not able to process, the media data is nevertheless played at the media player executing in the first operating system.

In some embodiments, subsequent to the request to playback the media data is generated, a media label corresponding to the media data is extracted from the source information. Based on the media label, it is determined whether the media data is encoded with a pre-configured media format.

In particular, the media format in which the media data is encoded is determined based on the media label. Next, it is determined whether the media format associated with the media data is one of the pre-configured media format known as supported in the first operating system. If it is determined that the media format of the media data is not any of the pre-configured formats, it is determined that the first operating system does not support this media format.

In some embodiments, the processing request is transmitted to the second operating system by the following sub-steps.

At sub-step 1, a communication interface, a two-way communication connection to the second operating system is established via a communication interface based on a control identifier of the first operating system.

At sub-step 2 the processing request is transmitted to the second operating system using the two-way communication connection.

In this example, the media player executing in the first operating system is configured to transmit the control identifier of the first operating system via a communication interface to the second operating system. As such, based on the control identifier, a two-way communication is established between the first operating system and the second operating system, which is used to transmit the processing request to the second operating system. Likewise, the processing results corresponding to the process request are received from the second operating system using the two-way communication.

In some embodiments, the processing results from the second operating system include status processing results and graphic processing results. Here, the request to play the media data based on the processing results includes the following sub-steps.

At sub-step 1 the handle corresponding to the second graphic is retrieved from the graphic processing results based on the status processing results.

At sub-step 2, the target transparent area is determined based on the handle, and the content of the first graphic is generated based on the target transparent area.

At sub-step 3, the first graphic is generated based on the content of the first graphic.

At sub-step 4, the second graphic is displayed in the target transparent area of the first graphic such that to play the media data.

In this example, the media player executing in the first operating system is configured to retrieve the handle corresponding to the second graphic from the graphic processing results and determine the target transparent area based on the handle. The content of the first graphic is generated based on the target transparent area. The first graphic is generated based on the content of the first graphic such that to display the second graphic in the target transparent area of the first graphic to play the media data.

In some embodiments, the handle corresponding to the second graphic is retrieved from the graphic processing results based on the status processing results includes the following. When it is detected that the status processing results include data in preparation mode, the media player enters the media playback mode based on the status data. In the playback mode, the handle corresponding to the second graphic is retrieved from the graphic processing results. In particular, after receiving the status processing results, the media player running in the first operating system is configured to detect whether the status processing results include status data in preparation mode. If so, it is determined that the second operating system has created and initialized a decoding environment. Therefore, the media player enters the playback mode to retrieve the handle corresponding to the second graphic from the graphic processing results. As a result, the display area corresponding to the media data is determined based on the handle as described in details above.

In some embodiments, prior to the media player generating the content of the first image based on the target transparent area, the status data is retrieved from the status processing results such that the content of the first graphic is generated based the status data, and the target transparent area.

Figure 11:
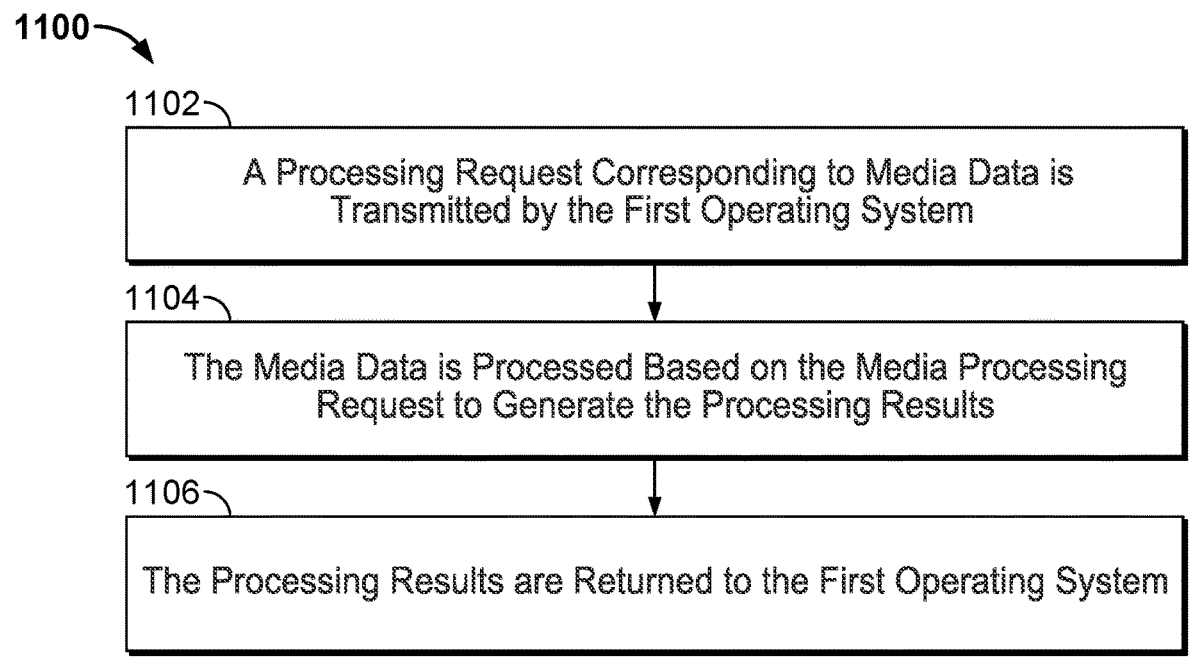
FIG. 11 is a flow chart of yet another process for playing media data, in accordance with one or more embodiments of the present disclosure.

FIG. 11 is a flow chart of yet another example process for playing media data, in accordance with an embodiment of the present disclosure. Process 1100 can be implemented by, for example, system 1200 of FIG. 12.

Process 1100 starts at 1102, where a processing request corresponding to media data is transmitted by the first operating system and received by the second operating system.

At 1104, the media data is processed by the second operating system based on the media processing request to generate the processing results.

At 1106, the processing results are returned to the first operating system.

As such, despite the fact that the first operating system does not support the media format in which the media data is encoded, with the second operating system being able to process the media data and transmit the processing results thereof back to the first operating system, the first operating system functions to play the media data at the user's request nevertheless.

In some embodiments, the media data is processed based on the processing request to generate the processing results by the following sub-steps.

At sub-step 1, the media application corresponding to the application package information is launched based on the processing request. Here, the application package information is determined based on the source information included in the processing request.

At sub-step 2, the media application is configured to respond to the processing request such that to generate the processing results corresponding to the media data.

In some embodiment, the media data corresponding to the processing request is retrieved based on the source information included in the processing request. The media data is decoded to generate data frames, which are in turn synthesized to generate the second graphic information. The second graphic information is set as the graphic processing results.

In some embodiments, the processing results corresponding to the media data are generated based on the results of monitoring the interface corresponding to the control identifier. The data frames are synthesized to generate the second graphic information when the control identifier of the first operating system is detected upon monitoring, and when it is determined that the data frames are encoded with a particular format. The data frames are synthesized to generate the second graphic and the handle corresponding to the second graphic.

In some embodiments, the media application is configured to respond to the processing request and generate processing results by using a SDK to decode the media data, and generate the status information, which is used to generate the status processing results. In some embodiments, the processing results are returned to the first operating system by sending the status processing results and the graphic processing results, together or separately, to the first operating system using a two-way communication connection.

Figure 12:
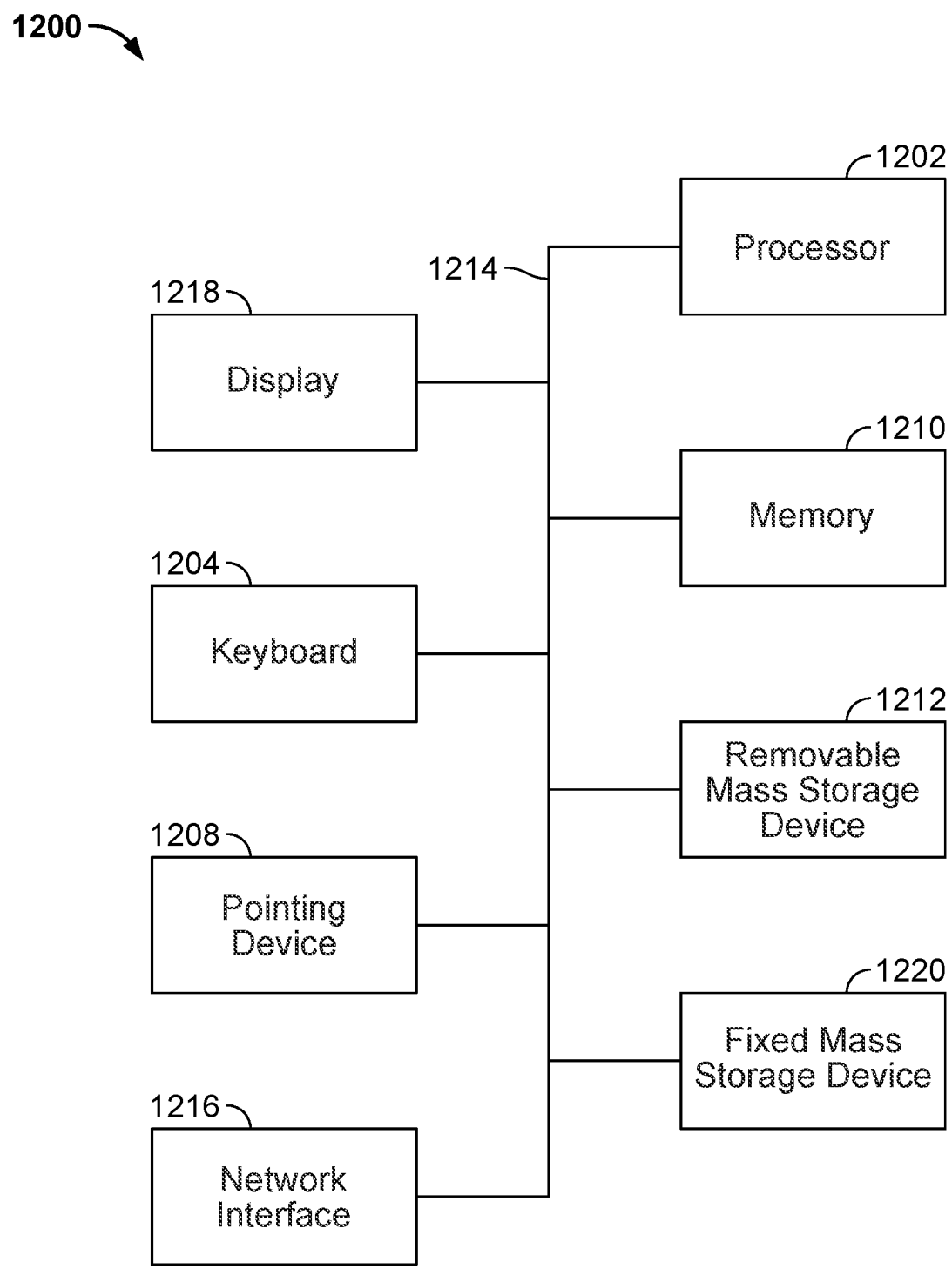
FIG. 12 is a block diagram illustrating an example programmed computer system for playing media data, in accordance with one or more embodiments of the present disclosure.

FIG. 12 is a functional diagram illustrating an embodiment of a programmed computer system for playing media data. As will be apparent, other computer system architectures and configurations can be used to play media data. Computer system 1200 can be used to implement system 100 and 300. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218). In some embodiments, processor 1202 includes and/or is used to provide the media data playing.

Processor 1202 is coupled bi-directionally with memory 1210, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data, and objects used by the processor 1202 to perform its functions (e.g., programmed instructions). For example, memory 1210 can include any suitable computer readable storage media, described below, depending on whether, for example, data access needs to be bi-directional or uni-directional. For example, processor 1202 can also directly and very rapidly retrieve and store frequently needed data in a cache memory (not shown).

A removable mass storage device 1212 provides additional data storage capacity for the computer system 1200 and is coupled either bi-directionally (read/write) or uni-directionally (read only) to processor 1202. For example, storage 1212 can also include computer readable media such as magnetic tape, flash memory, PC-CARDS, portable mass storage devices, holographic storage devices, and other storage devices. A fixed mass storage 1220 can also, for example, provide additional data storage capacity. The most common example of fixed mass storage 1220 is a hard disk drive. Mass storages 1212, 1220 generally store additional programming instructions, data, and the like that typically are not in active use by the processor 1202. It will be appreciated that the information retained within mass storages 1212 and 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display 1218, a network interface 1216, a keyboard 1204, and a pointing device 1208, as well as an auxiliary input/output device interface, a sound card, speakers, and other subsystems as needed. For example, the pointing device 1208 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that embodiments of the present application can be provided as methods, systems, or computer program products. Therefore, the present application can take the form of an entirely hardware embodiment, an entirely software embodiment, or an embodiment that combines software and hardware aspects. In addition, the present application can take the form of computer program products implemented on one or more computer-operable storage media (including but not limited to magnetic disk storage devices, CD-ROMs, and optical storage devices) containing computer operable program codes.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be realized by computer commands. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command devices. These command devices implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for playing media data, comprising:
   establishing, by a first operating system, a two-way communication connection with a second operating system based at least in part on a control identifier associated with the first operating system;
   transmitting, by the first operating system, a request for processing the media data to the second operating system over the two-way communication connection, the first operating system and the second operating system being installed on a same device, wherein the request includes parameter information including an application package information that is usable by the second operating system to identify a media application for processing the media data, wherein the media application is usable by the second operating system to obtain a decoding environment in which to decode the media data, wherein the second operating system is configured to:
      monitor a value associated with a control identifier interface, wherein the value indicates whether graphic information is generated for the second operating system or generated for the first operating system;

in response to the determination that the value associated with the control identifier interface indicates that the graphic information is generated for the first operating system, determine that generated data frames are generated in response to the request; and
generate the graphic information based on the generated data frames;
receiving, by the first operating system, processing results from the second operating system over the two-way communication connection, wherein the processing results comprise graphic processing results comprising the graphic information, wherein the second operating system is configured to process the media data based at least in part on the parameter information included in the request to generate the processing results; and
playing the media data by the first operating system based at least in part on the processing results.

2. The method of claim 1, further comprising:
generating, by a browser kernel of the first operating system, a playback request based on a user's operation, the playback request including source information of the media data;
analyzing, by the first operating system, the source information of the media data based on the playback request to determine whether the first operating system is configured to process the media data; and
wherein the request for processing the media data is transmitted to the second operating system in response to a determination that the first operating system is not configured to process the media data.

3. The method of claim 2, wherein the source information of the media data includes a media label, and wherein the analyzing of the source information of the media data based on the playback request comprises:
retrieving, by the browser kernel, the media label corresponding to the media data from the source information of the media data;
determining whether the media data is encoded with a pre-configured media format based at least in part on the retrieved media label; and
wherein the first operating system is determined not to be configured to process the media data in response to a determination that the media data is not encoded with the pre-configured media format.

4. The method of claim 3, wherein the transmitting by the first operating system the request for processing the media data to the second operating system comprises:
transmitting, by the browser kernel, the parameter information corresponding to the media data to a bridge service module of the first operating system; and
generating, by the bridge service module, the request for processing the media data based at least in part on the parameter information upon receiving the parameter information.

5. The method of claim 4, further comprising:
retrieving the control identifier associated with the first operating system via a system interface; and
configuring the retrieved control identifier and the source information of the media data as the parameter information.

6. The method of claim 5, wherein the generating of the request for processing the media data based at least in part on the parameter information comprises:
extracting the source information from the parameter information;
determining the application package information based at least in part on the source information; and
generating the request for processing the media data based on the parameter information and the application package information.

7. The method of claim 6, wherein the processing of the media data based at least in part on the request for processing the media data to generate the processing results comprises:
launching the media application corresponding to the application package information based on the request for processing the media data; and
responding to the request for processing the media data by use of the media application to generate the processing results corresponding to the media data.

8. The method of claim 7, wherein the responding to the request for processing the media data by use of the media application to generate the processing results corresponding to the media data comprises:
retrieving, by the media application, the media data corresponding to the request for processing the media data based at least in part on the source information; and
creating, by the media application, the decoding environment via a media service interface to decode the media data to generate the processing results.

9. The method as described in claim 8, wherein the creating of the decoding environment via the media service interface to decode the media data to generate the processing results comprises:
transmitting the retrieved media data to a second media service module via the media service interface;
decoding, by the second media service module, the media data to generate data frames;
transmitting the generated data frames to a second graphic service module; and
synthesizing the generated data frames to generate the graphic information, wherein the graphic information is set as the graphic processing results.

10. The method of claim 9, further comprising:
in response to the determination that the value associated with the control identifier interface indicates that the graphic information is generated for the first operating system, connecting to a first graphic service module of the first operating system based at least in part on the value associated with the control identifier interface.

11. The method of claim 10, wherein the synthesizing of the data frames to generate the graphic information comprises:
in response to the determination that the value associated with the control identifier interface indicates that the graphic information is generated for the first operating system, determining that the data frames are encoded with a particular media format; and
synthesizing the data frames to generate a second graphic and a handle corresponding to the graphic information.

12. The method of claim 9, wherein the creating of the decoding environment via the media service interface to decode the media data to generate the processing results comprises:
decoding the media data using a software development kit (SDK) to generate playback status information, the generated playback status information being set as status processing results.

13. The method of claim 12, wherein transmitting of the processing results to the first operating system comprises:
transmitting, by the media application, the status processing results to the bridge service module; and transmitting, by the second graphic service module, the graphic processing results to a first graphic service module.

14. The method of claim 13, wherein responding to the media data based at least in part on the processing results comprises:
   forwarding, by the bridge service module, the received status processing results to the browser kernel;
   obtaining, by the browser kernel, a handle corresponding to a second graphic received at the first graphic service module based on the status processing results;
   determining a target transparent area based at least in part on the handle to generate content of a first graphic based at least in part on the target transparent area, wherein the content of the first graphic is transmitted to the first graphic service module; and
   generating, by the first graphic service module, the first graphic based on the content of the first graphic, wherein the second graphic is displayed in the target transparent area of the first graphic to play the media data.

15. The method of claim 14, wherein the obtaining of the handle corresponding to the second graphic received at the first graphic service module based on the status processing results comprises:
   in response to detecting that the status processing results include data of preparation mode, entering a media playback mode based at least in part on the data of the preparation mode; and
   obtaining the handle corresponding to the second graphic received at the first graphic service module in the media playback mode.

16. The method of claim 15, further comprising:
   extracting playback status data from the status processing results; and
   generating the content of the first graphic based at least in part on the playback status data and the target transparent area.

17. The method of claim 15, wherein determining of the target transparent area corresponding to the second graphic based at least in part on the handle comprises:
   determining a location and a size of a display area for the second graphic on the first graphic using the handle;
   determining the display area for displaying the second graphic on the first graphic based on the location and the size of the display area; and
   designating the display area as the target transparent area.

18. A method for playing media data, comprising:
   receiving, by a second operating system, a request for processing the media data from a first operating system via a two-way communication connection, the first operating system and the second operating system being installed on a same device, wherein the request includes parameter information including an application package information, wherein the two-way communication connection is established by the first operating system based at least in part on a control identifier associated with the first operating system;
   processing the media data, by the second operating system, based at least in part on the parameter information included in the request to generate processing results, wherein the processing results are transmitted to the first operating system over the two-way communication connection, wherein the processing the media data by the second operating system comprises:
      identifying, by the second operating system, a media application for processing the media data based at least in part on the application package information;
      using, by the second operating system, the media application to obtain a decoding environment;
      using, by the second operating system, the decoding environment to decode the media data into generated data frames;
      monitoring a value associated with a control identifier interface, wherein the value indicates whether graphic information is generated for the second operating system or generated for the first operating system;
      in response to the determination that the value associated with the control identifier interface indicates that the graphic information is generated for the first operating system, determining that the generated data frames are generated in response to the request; and
      generating the graphic information based on the generated data frames, wherein the processing results comprise the graphic information; and
   playing the media data by the first operating system based at least in part on the processing results.

19. A system for playing media data, comprising:
   one or more processors configured to:
      establish, by a first operating system, a two-way communication connection with a second operating system based at least in part on a control identifier associated with the first operating system;
      transmit, by the first operating system, a request for processing the media data to the second operating system over the two-way communication connection, the first operating system and the second operating system being installed on a same device, wherein the request includes parameter information including an application package information that is usable by the second operating system to identify a media application for processing the media data, wherein the media application is usable by the second operating system to obtain a decoding environment in which to decode the media data, wherein the second operating system is configured to:
         monitor a value associated with a control identifier interface, wherein the value indicates whether graphic information is generated for the second operating system or generated for the first operating system;
         in response to the determination that the value associated with the control identifier interface indicates that the graphic information is generated for the first operating system, determine that generated data frames are generated in response to the request; and
         generate the graphic information based on the generated data frames;
      receive, by the first operating system, processing results from the second operating system over the two-way communication connection, wherein the processing results comprise graphic processing results comprising the graphic information, wherein the second operating system is configured to process the media data based at least in part on the parameter information included in the request to generate the processing results; and
      play the media data by the first operating system based at least in part on the processing results; and one or more memories coupled to the one or more processors, configured to provide the one or more processors with instructions.

20. A computer program product, the computer program product being embodied in a tangible computer readable storage medium and comprising computer instructions for:

establishing, by a first operating system, a two-way communication connection with a second operating system based at least in part on a control identifier associated with the first operating system;

transmitting, by the first operating system, a request for processing media data to the second operating system over the two-way communication connection, the first operating system and the second operating system being installed on a same device, wherein the request includes parameter information including an application package information that is usable by the second operating system to identify a media application for processing the media data, wherein the media application is usable by the second operating system to obtain a decoding environment in which to decode the media data, wherein the second operating system is configured to:

monitor a value associated with a control identifier interface, wherein the value indicates whether graphic information is generated for the second operating system or generated for the first operating system;

in response to the determination that the value associated with the control identifier interface indicates that the graphic information is generated for the first operating system, determine that generated data frames are generated in response to the request; and generate the graphic information based on the generated data frames;

receiving, by the first operating system, processing results from the second operating system over the two-way communication connection, wherein the processing results comprise graphic processing results comprising the graphic information, wherein the second operating system is configured to process the media data based at least in part on the parameter information included in the request to generate the processing results; and playing the media data by the first operating system based at least in part on the processing results.

\* \* \* \* \*

UNITED STATES PATENT AND TRADEMARK OFFICE
CERTIFICATE OF CORRECTION

PATENT NO. : 11,245,885 B2
APPLICATION NO. : 16/144525
DATED : February 8, 2022
INVENTOR(S) : Liu et al.

It is certified that error appears in the above-identified patent and that said Letters Patent is hereby corrected as shown below:

In the Specification

In Column 8, Line(s) 41, delete "CreateSub Surface" and insert --CreateSubSurface--, therefor.
In Column 8, Line(s) 43, delete "SetSub Surface" and insert --SetSubSurface--, therefor.
In Column 20, Line(s) 37, delete "Sub Surface" and insert --SubSurface--, therefor.
In Column 22, Line(s) 20, delete "Sub Surface" and insert --SubSurface--, therefor.

Signed and Sealed this
Fourteenth Day of June, 2022

Katherine Kelly Vidal
*Director of the United States Patent and Trademark Office*